US010701130B2

(12) United States Patent
Movsisyan et al.

(10) Patent No.: US 10,701,130 B2
(45) Date of Patent: Jun. 30, 2020

(54) METHODS AND SYSTEMS THAT USE FEEDBACK TO DISTRIBUTE AND MANAGE ALERTS

(71) Applicant: VMware, Inc., Palo Alto, CA (US)

(72) Inventors: Vardan Movsisyan, Yerevan (AM); Gor Ghazaryan, Yerevan (AM); Arman Mkrtchyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 425 days.

(21) Appl. No.: 15/613,523

(22) Filed: Jun. 5, 2017

(65) Prior Publication Data
US 2018/0351781 A1    Dec. 6, 2018

(51) Int. Cl.
*H04L 12/24* (2006.01)
*H04L 29/08* (2006.01)

(52) U.S. Cl.
CPC ............ *H04L 67/025* (2013.01); *H04L 41/06* (2013.01); *H04L 41/0654* (2013.01); *H04L 41/30* (2013.01); *H04L 67/02* (2013.01); *H04L 67/10* (2013.01)

(58) Field of Classification Search
CPC ....... H04L 67/025; H04L 67/02; H04L 67/10; H04L 41/30; H04L 41/06; H04L 41/0654
See application file for complete search history.

(56) References Cited

U.S. PATENT DOCUMENTS

| 2001/0042056 | A1* | 11/2001 | Ferguson ............... G06Q 10/10 706/10 |
| 2009/0327429 | A1* | 12/2009 | Hughes ................ G06Q 10/107 709/206 |
| 2011/0138291 | A1* | 6/2011 | Twiddy ............... H04L 41/0213 715/735 |
| 2014/0143831 | A1* | 5/2014 | Fieweger .............. H04L 9/3231 726/3 |
| 2015/0207813 | A1* | 7/2015 | Reybok ................. H04L 63/145 726/22 |
| 2016/0321906 | A1* | 11/2016 | Whitney ............... G06F 3/0484 |
| 2018/0232346 | A1* | 8/2018 | Konnola ............. G06Q 10/101 |

* cited by examiner

*Primary Examiner* — Nicholas R Taylor
*Assistant Examiner* — Sanjoy K Roy
(74) *Attorney, Agent, or Firm* — Clayton, McKay & Bailey, PC

(57) ABSTRACT

The current document is directed to methods and systems that employ user feedback and user-initiated alert-generation-and-distribution-system modifications to provide for flexibility and responsiveness. In a described implementation, participants in a social environment provided by a collaborative alert-generation-and-distribution-system suggest modifications which are automatically or semi-automatically incorporated in an alert-generation-and-distribution-system when the participants agree to the suggested modifications.

20 Claims, 28 Drawing Sheets

```
                1208    1210
       1202                              1212
           2013-12-02T10:44:24.095Z li-qe-esx5.vmware.com Rhttpproxy:
           [28959B90 verbose 'Proxy Req 46691'] Connected to
           localhost:8307                               1206

2013-12-02T10:44:24.094Z li-qe-esx5.vmware.com Rhttpproxy:
           [FFFC2B90 verbose 'Proxy Req 46691'] new proxy client
           TCP (local-127.0.0.1:80, peer=127.0.0.1:50155)

2013-12-02T10:44:24.093Z li-qe-esx5.vmware.com Rhttpproxy:
           [2889B90 verbose 'Proxy Req 46685'] The client closed the
           stream, not unexpectedly.

Dec  2 18:48:29 strata-vc 2013-12-02T18:48:30.273Z
           [7FA39448B700 info 'commonvpxLro' opID=1947d6f9]  [VpxLRO] -
           FINISH task-internal-2163522 -- -- vim.SessionManager.logout -

2013-12-02T18:48:51.396Z strata-esx1.eng.vmware.com Vpxa:
           [65B5AB90 verbose 'VpxaHalCnxHostagent' opID=WFU-ed393333]
           [WaitForUpdatesDone] Completed callback 2013-12-02T18:48:51.395Z strata-esx1.eng.vmware.com Vpxa:          } 1204
           [65B5AB90 verbose 'VpxaHalCnxHostagent' opID=WFU-ed393333]
           [WaitForUpdatesDone] Starting next WaitForUpdates() call to
           hostd 2013-12-02T18:48:51.395Z strata-esx1.eng.vmware.com Vpxa:
           [65B5AB90 verbose 'vpxavpxaInvtVm' opID=WFU-ed393333]
           [VpxaInvtVmChangeListener] Guest DiskInfo Changed 2013-12-02T18:48:51.395Z strata-esx1.eng.vmware.com Vpxa:
           [65B5AB90 verbose 'halservices' opID=WFU-ed393333]
           [VpxaHalServices] VMGuestDiskChange Event for vm(6) 59

2013-12-02T18:48:51.395Z strata-esx1.eng.vmware.com Vpxa:
           [65B5AB90 verbose 'hostdvm' opID=WFU-ed393333]
           [VpxaHalVmHostagent] 59: GuestInfo changed 'guest.disk'

2013-12-02T18:48:51.395Z strata-esx1.eng.vmware.com Vpxa:
           [65B5AB90 verbose 'VpxaHalCnxHostagent' opID=WFU-ed393333]
           [VpxaHalCnxHostagent::ProcessUpdate] Applying updates from
           123718 to 123719 (at 123718)

2013-12-02T18:48:51.395Z strata-esx1.eng.vmware.com Vpxa:
           [65B5AB90 verbose 'VpxaHalCnxHostagent' opID=WFU-ed393333]
           [WaitForUpdatesDone] Received callback
           2013-12-02T18:48:51.360Z li-dev-esx6.eng.vmware.com Hostd:
           [617C1B90 error 'SoapAdapter.HTTPService'] HTTP Transaction
```

FIG. 12

```
CREATE TABLE GROUP_ID
(
   Group_ID    INTEGER,
   Name        VARCHAR (20),          } 1802
   Description VARCHAR (100)
);

SELECT      Name, Description
FROM        ALERTS                     } 1804
WHERE   Alert_Type = 361;

SELECT P.Priority_mult, A.Name
FROM    ALERTS A, ALERT_SOURCE_PRIORITES P
WHERE   A.Alert_Type = 361  AND        } 1806
        A.Alert_Type = P.Alert_Type;

INSERT INTO VOTES
VALUES (4621, TRUE);  } 1808
                            ⌐ 1812    ⌐ 1813    ⌐ 1814
CREATE PROCEDURE VOTE (@pid INTEGER, @pnid INTEGER; @v BOOLEAN)
AS
BEGIN
INSERT INTO VOTES                                              } 1810
VALUES (@pid, @pnid, @v)
END EXECUTE Vote 4621, 13, TRUE  } 1816

DELETE
FROM VOTES                             } 1818
WHERE VOTES.Proposal_ID = 4621;

UPDATE ALERTS
SET Description = 'Disk drive failure without restart'  } 1820
WHERE Alert_Type = 203;
```

FIG. 18

METHODS AND SYSTEMS THAT USE FEEDBACK TO DISTRIBUTE AND MANAGE ALERTS

TECHNICAL FIELD

The current document is directed to the generation and distribution of alerts and, in particular, to methods and systems that employ user feedback and user-initiated proposals from alert recipients to add, remove, and update information employed by an alert generation and distribution system for alert generation and distribution.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies.

In many systems, alerts are generated when certain types of event messages are received by monitoring-and-management systems. The alerts are distributed to personnel responsible for monitoring, managing, and administering the systems, so that failures and system-degrading events are quickly evaluated and addressed. The alerts may be received and displayed on personal computers, laptops, and works stations, but may also to received and displayed on smart phone, tablets, and other types of devices. Alerts may also be distributed to pagers, telephones, and other devices that receive alerts and notify personnel who own and/or use the devices. Although alert distribution is an effective method for quickly notifying personnel and marshalling needed personnel to address system failures and system-degrading events, currently available alert generation and distribution systems lack flexibility and responsiveness to user feedback. For example, it may turn out that a particular high-priority alert is often spuriously generated. In such cases, it would be beneficial for the high-priority alert to be downgraded in priority or disabled altogether, to avoid unnecessary diversion of personnel to respond to spurious alerts. However, in currently available systems, such changes often require high-latency report submission, authorization, and reprogramming or reconfiguration, as a result of which the spurious alert may continue to be generated for days or weeks before the alert can be disabled or reprogrammed. Users of alert-generating systems and subsystems continue to seek more flexibly and easily modified and managed alert systems.

SUMMARY

The current document is directed to methods and systems that employ user feedback and user-initiated alert-generation-and-distribution-system modifications to provide for flexibility and responsiveness. In a described implementation, participants in a social environment provided by a collaborative alert-generation-and-distribution-system suggest modifications which are automatically or semi-automatically incorporated in an alert-generation-and-distribution-system when the participants agree to the suggested modifications.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIG. 18 provides a number of examples of SQL queries in the context of the relational database tables shown in FIGS. 17A-B.

DETAILED DESCRIPTION

Figure 1:
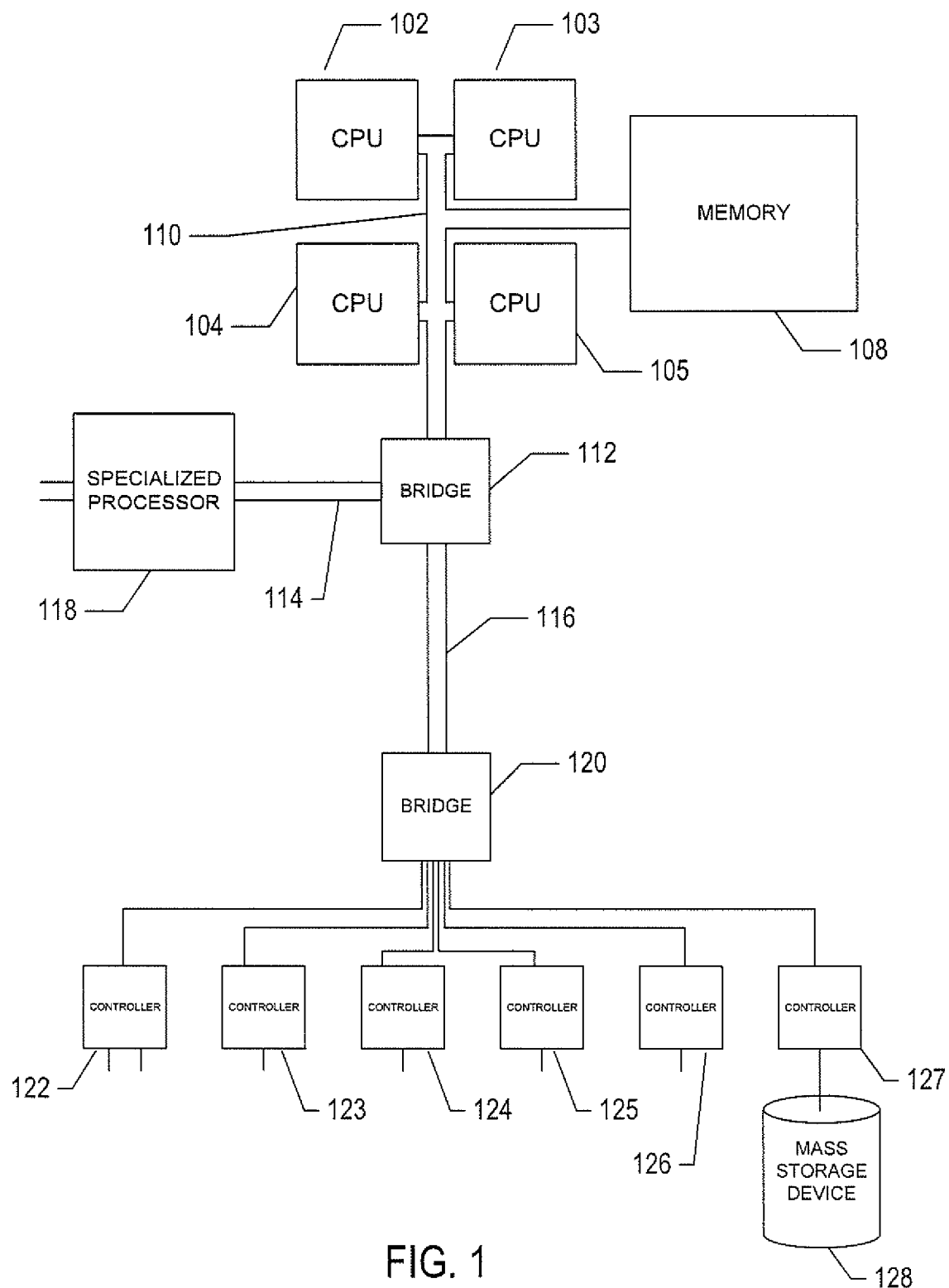
FIG. 1 provides a general architectural diagram for various types of computers.

The current document is directed to methods and systems that employ user-initiated proposals and automated consensus determination to dynamically modify the alert-generation-and-distribution systems. In a first subsection, below, a detailed description of computer hardware, complex computational systems, and virtualization is provided with reference to FIGS. 1-10. In a second subsection, event-message processing and alert generation and distribution are discussed with reference to FIGS. 11-15B. A final subsection discusses methods and alert-generation-and-distribution systems Computer Hardware, Complex Computational Systems, and Virtualization The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
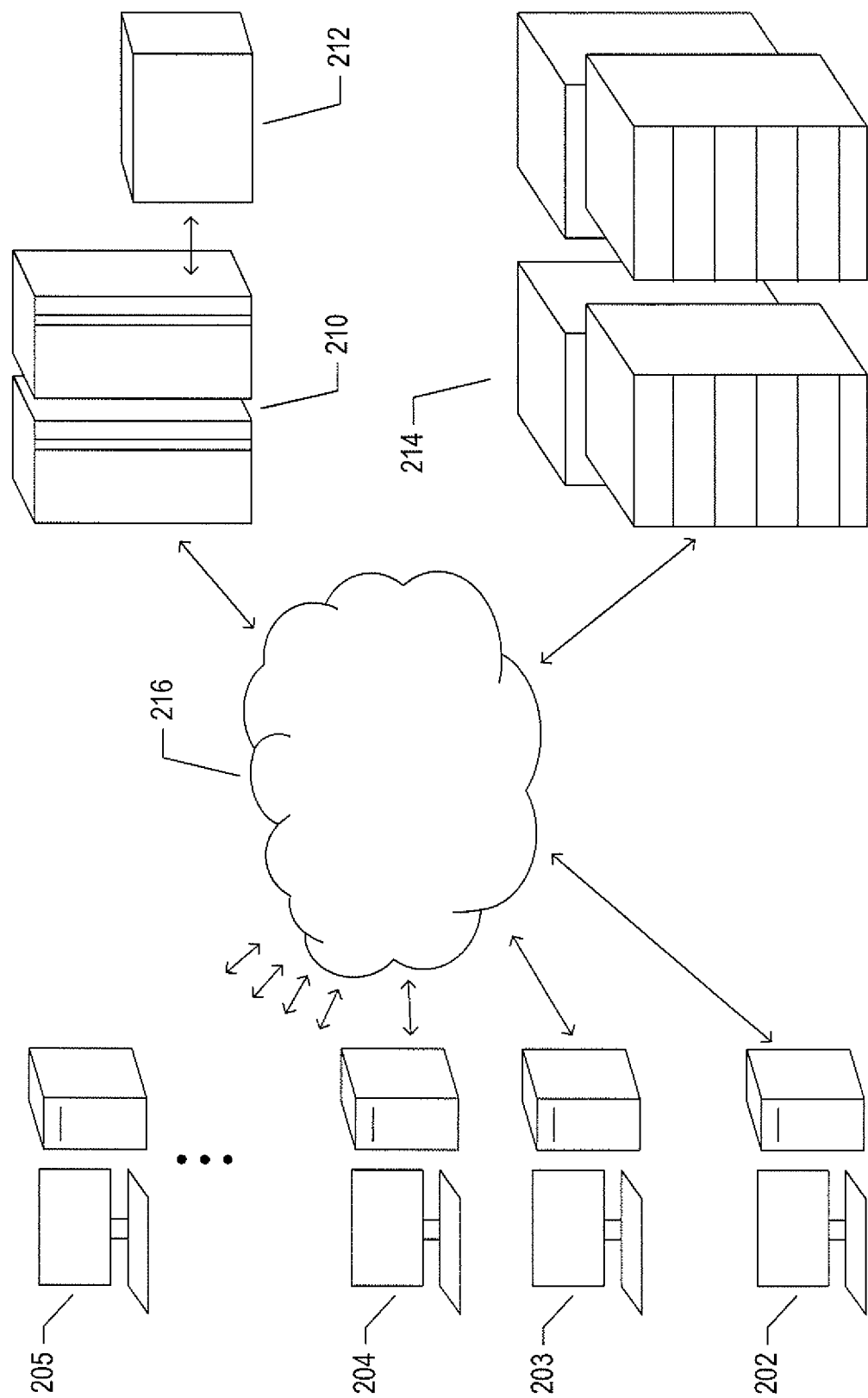
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
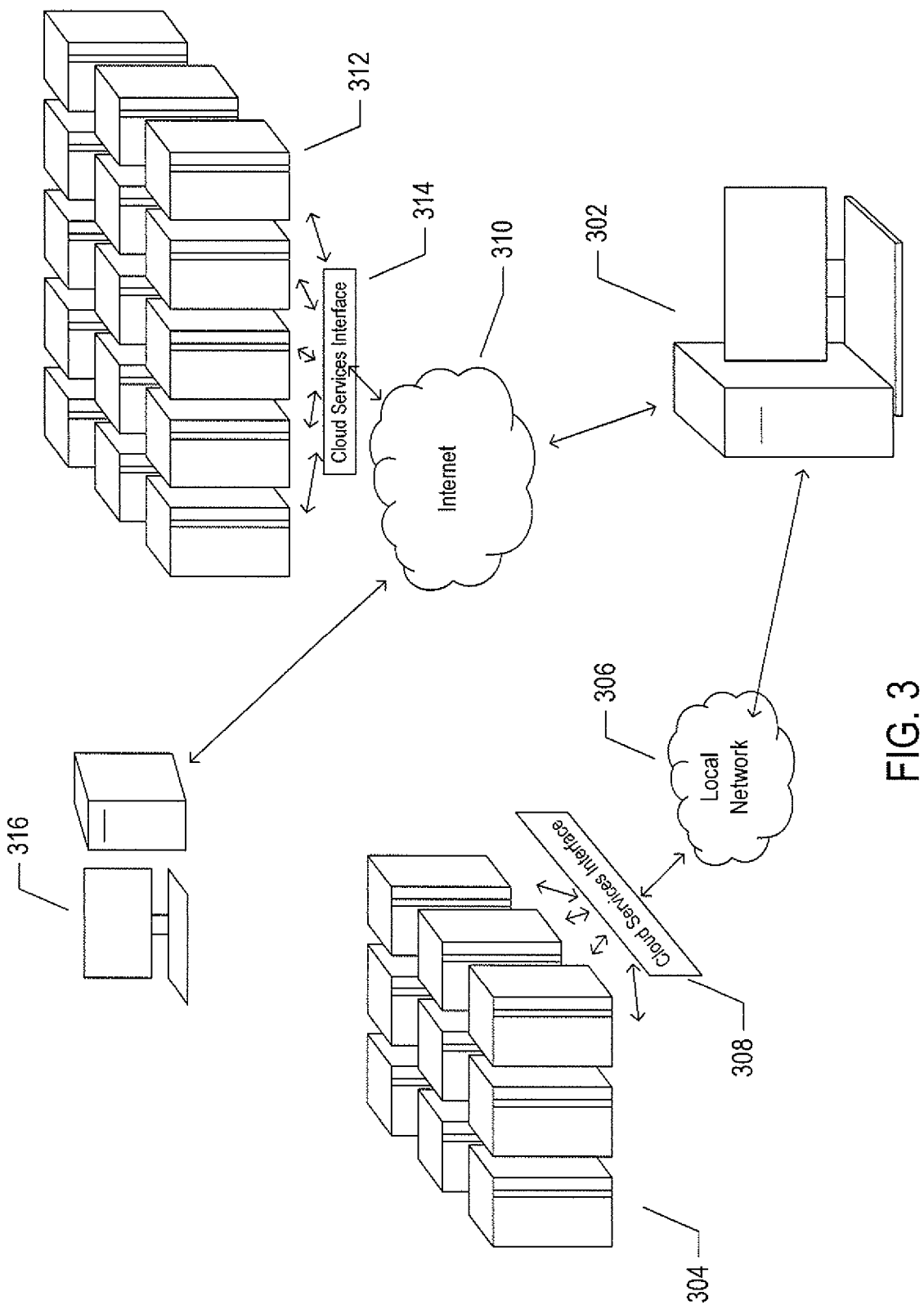
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
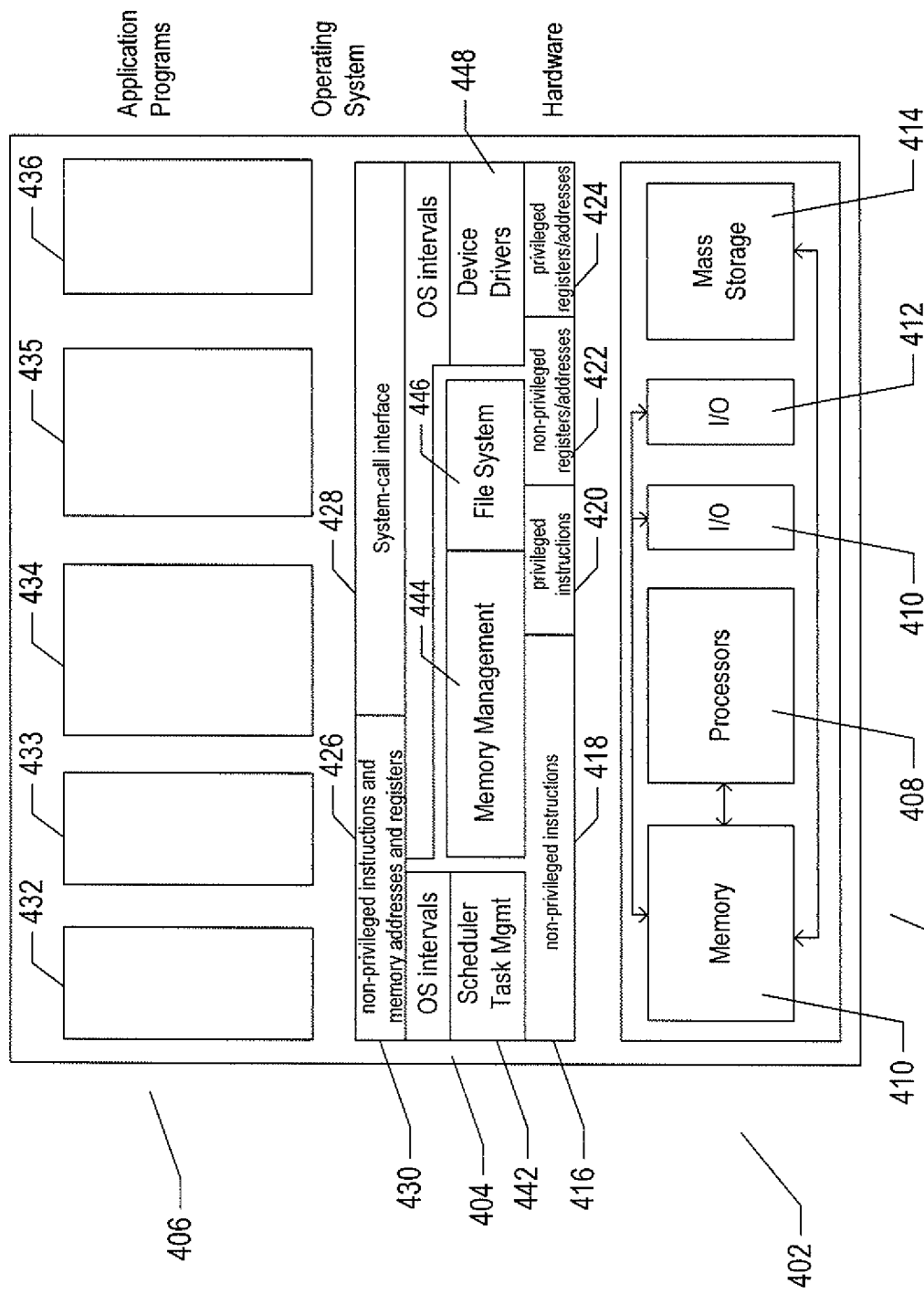
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
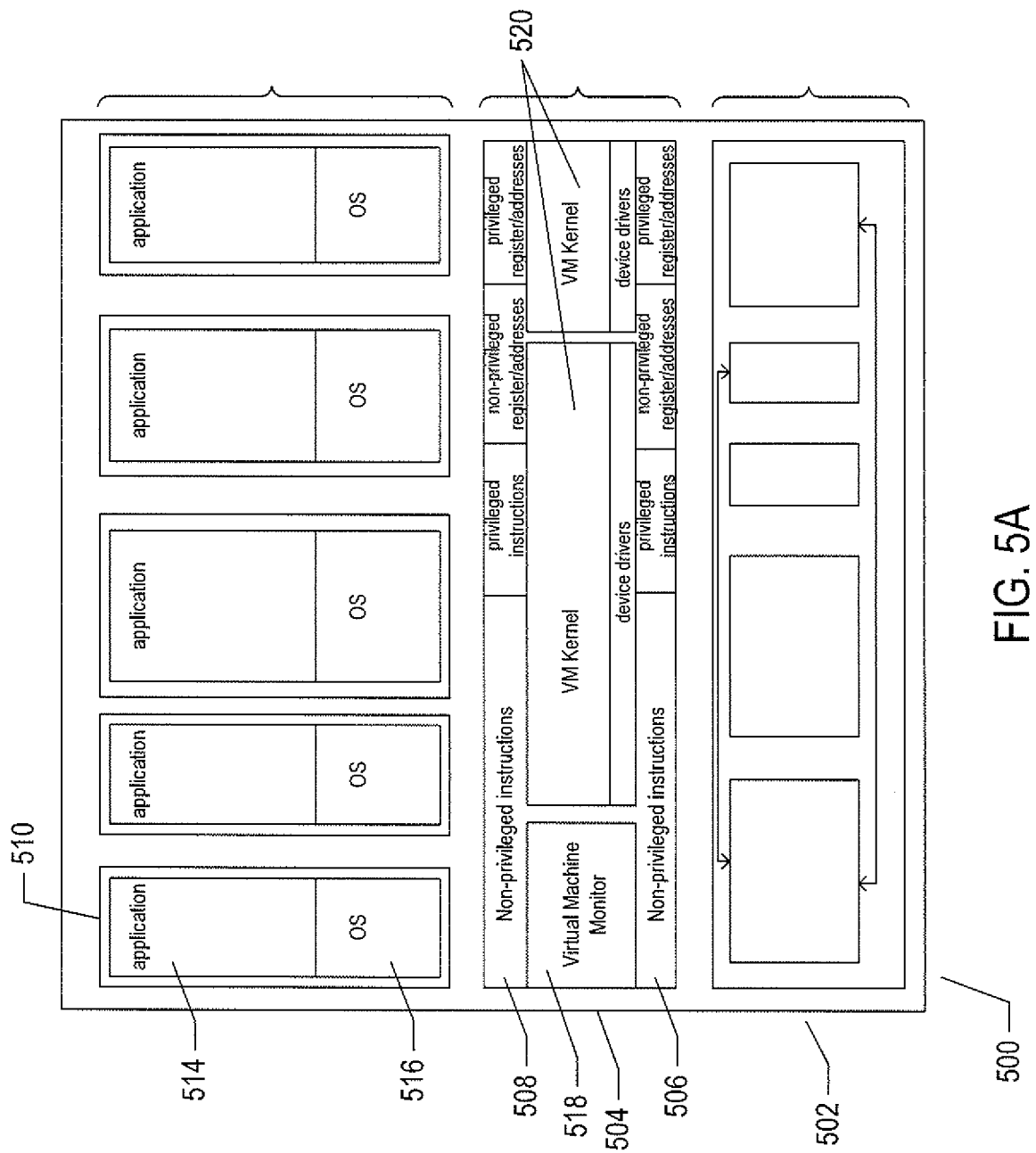
FIGS. 5A-B illustrate two types of virtual machine and virtual-machine execution environments.
Figure 5B:
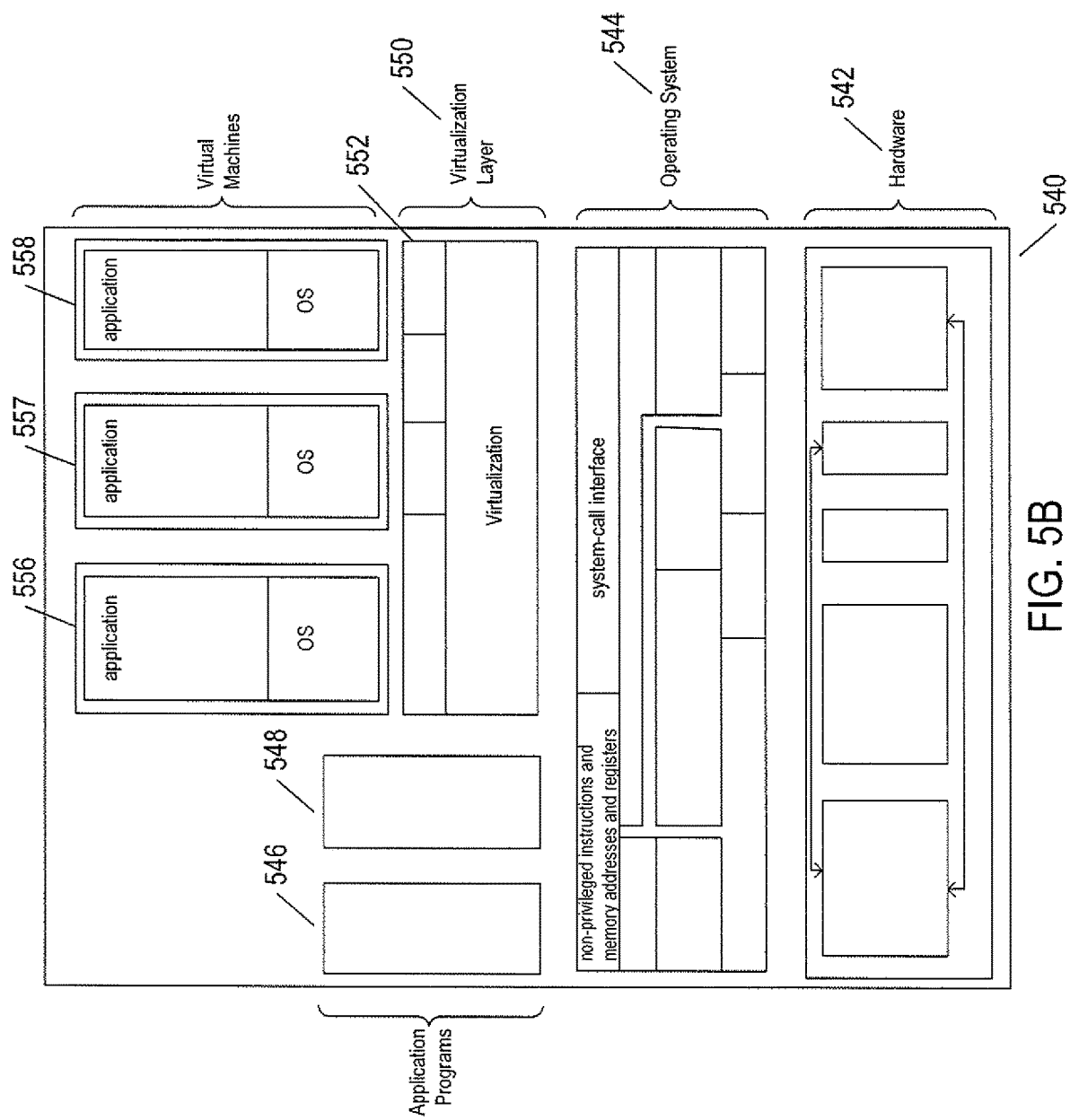

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
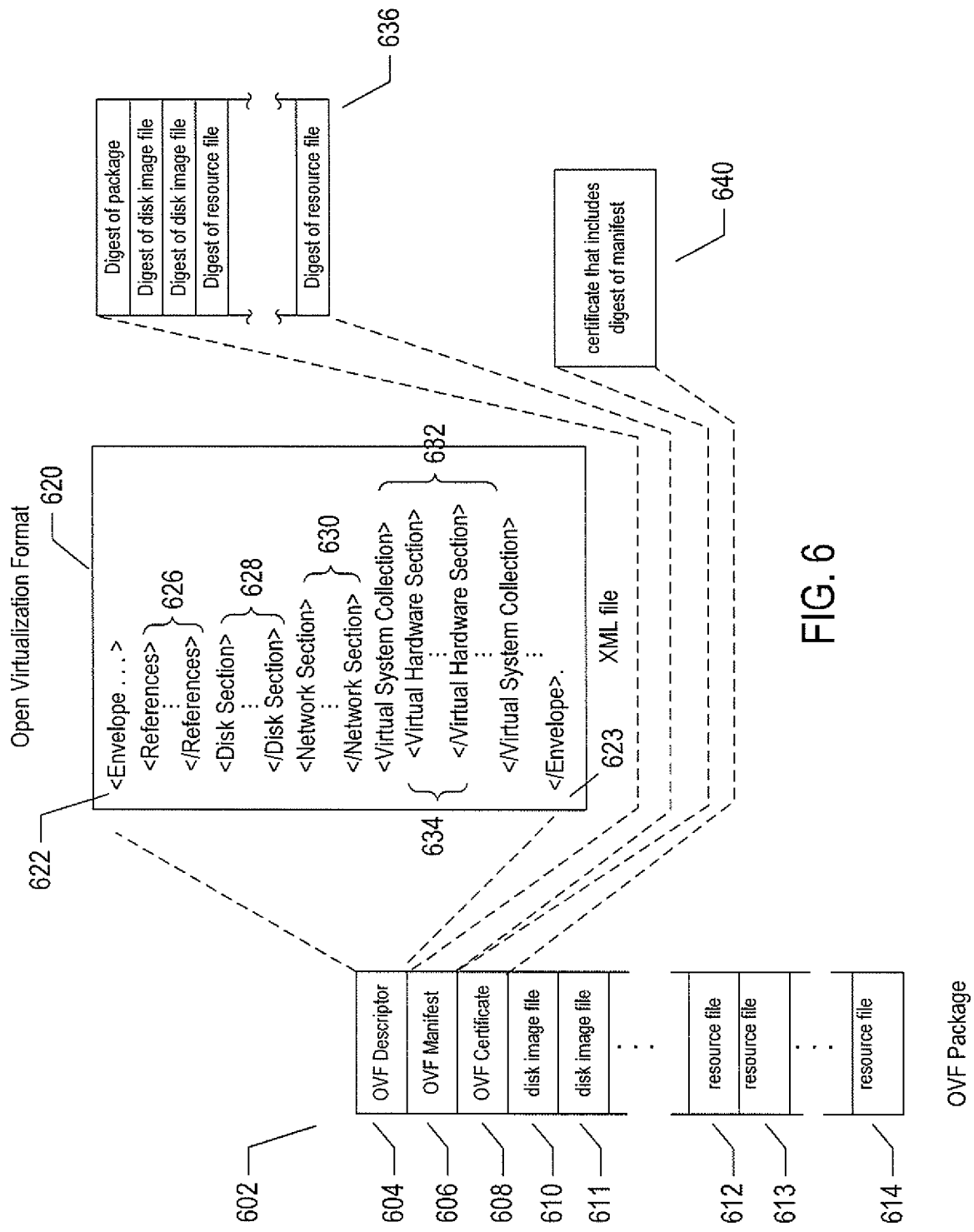
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
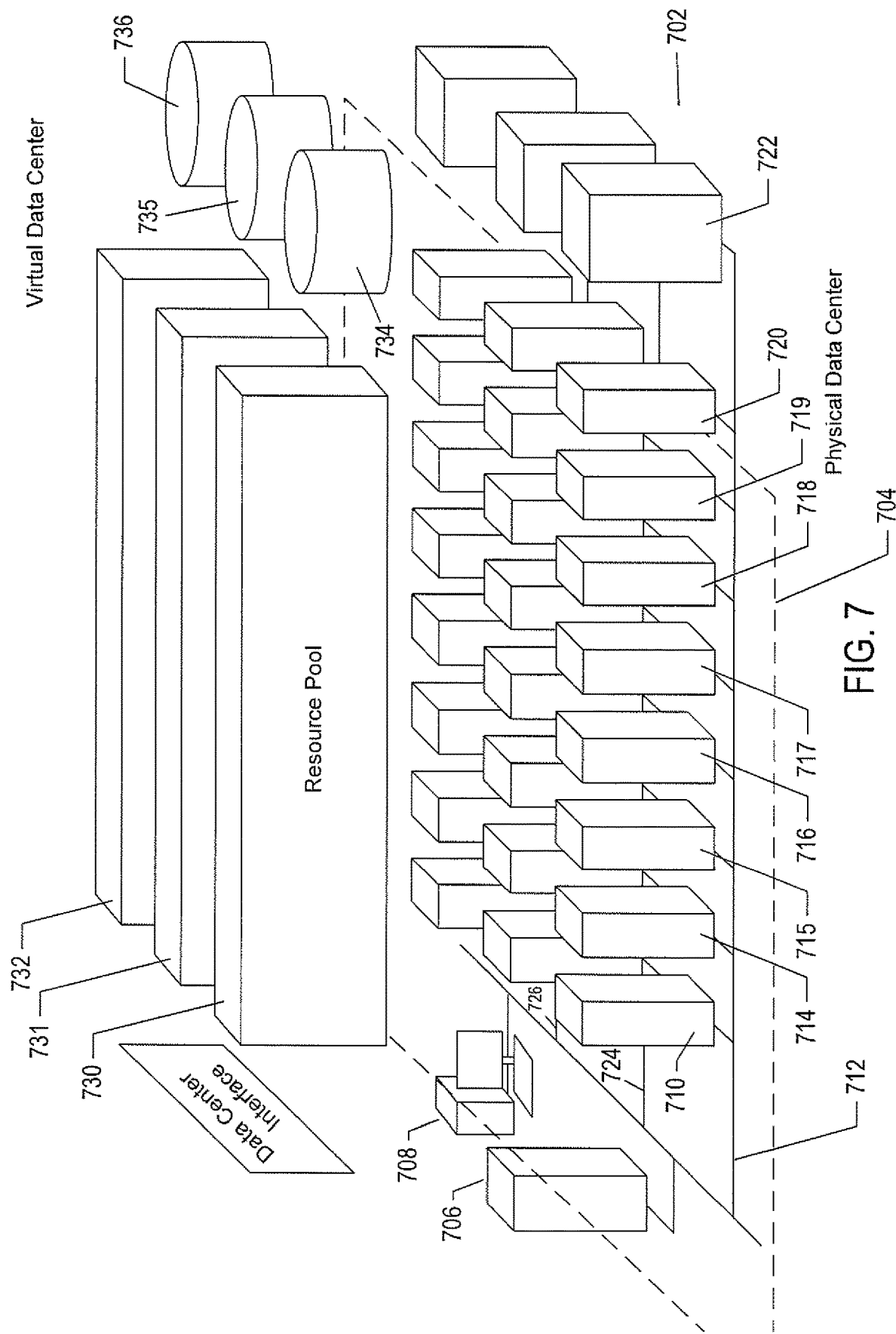
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
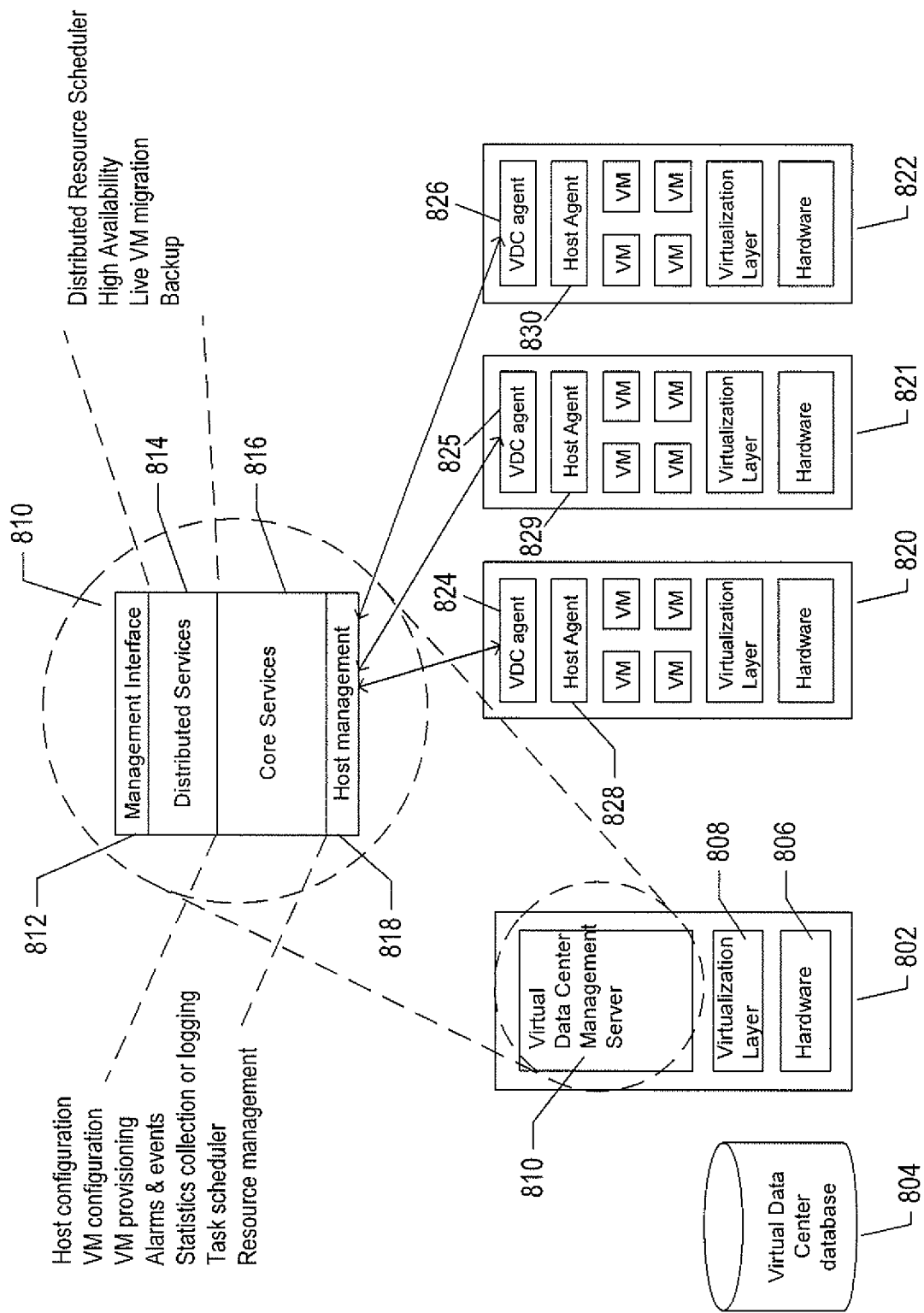
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
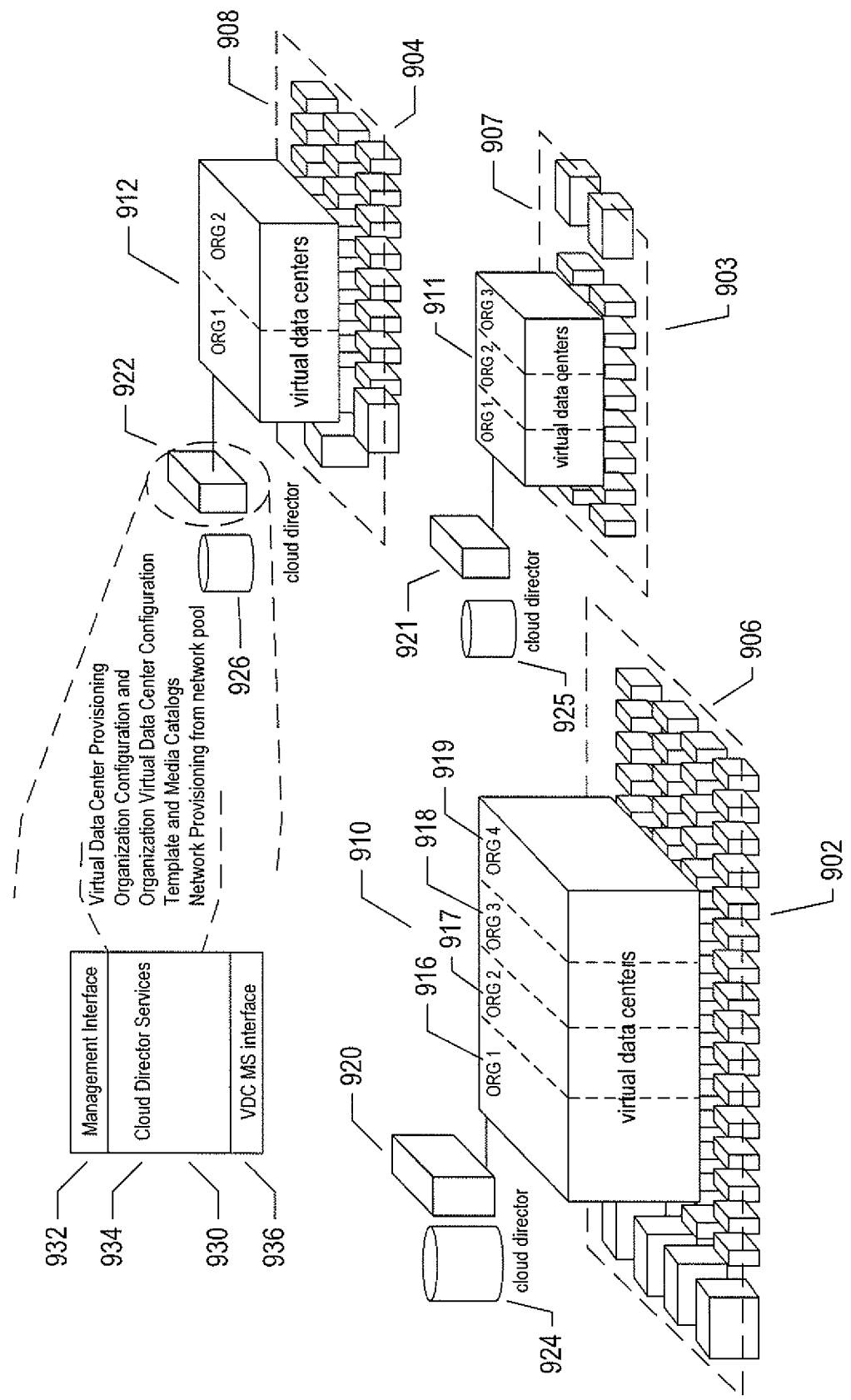
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
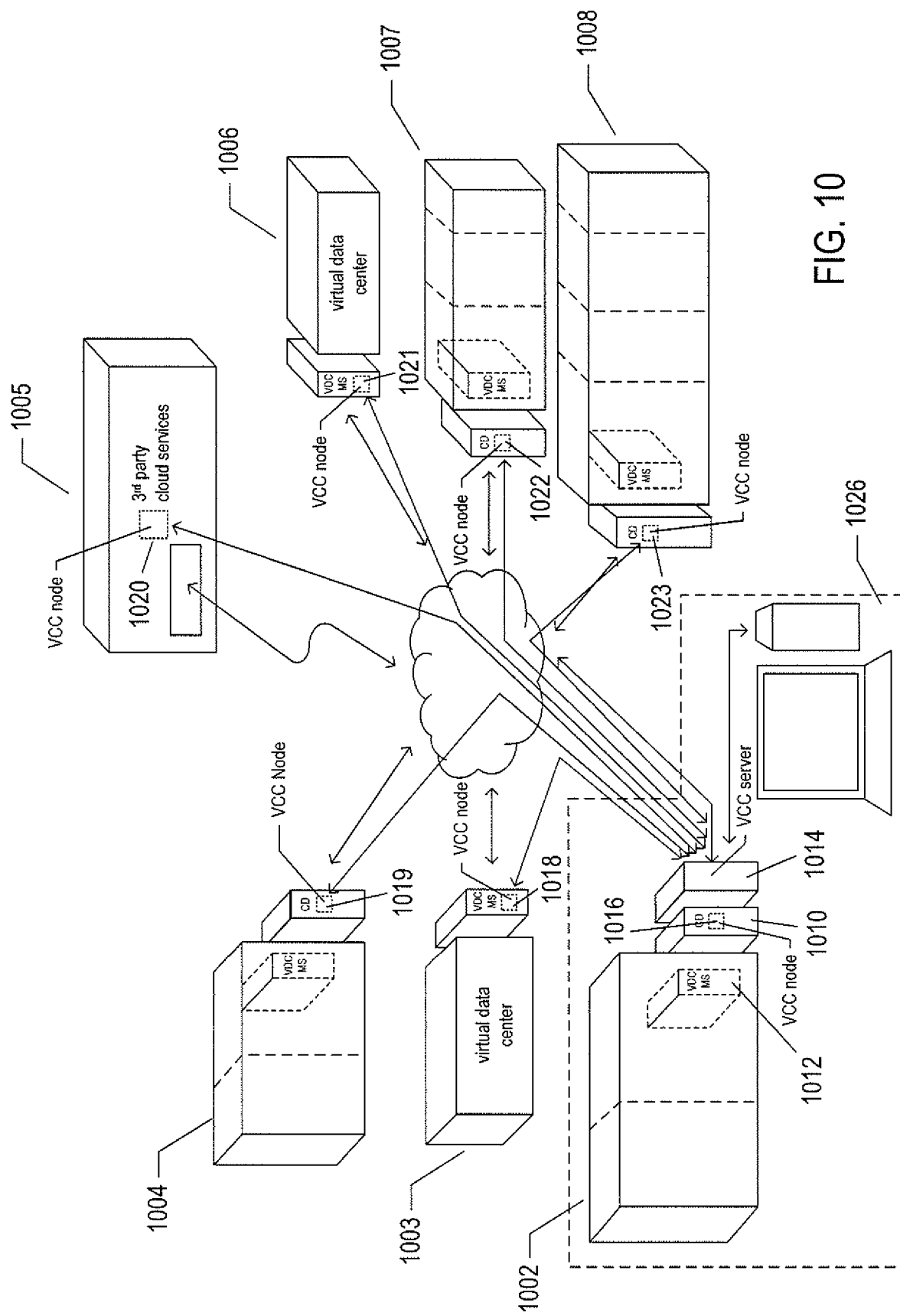
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Generation and Alert Generation and Distribution

Figure 11:
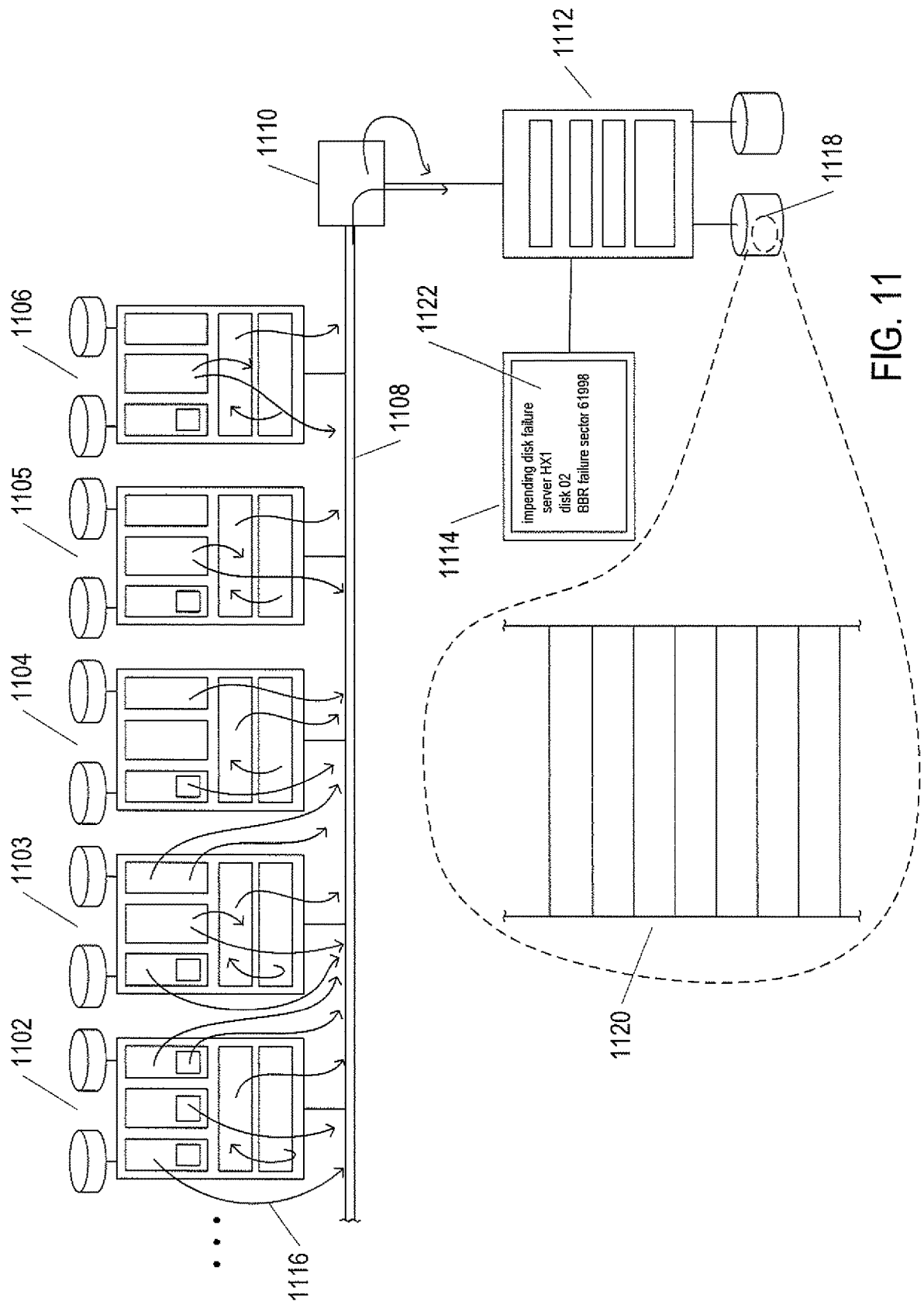
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an monitoring-and-management system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the monitoring-and-management system 1112. Event messages may be relatively directly transmitted from a component within a discrete computer system to the monitoring-and-management system or may be collected at various hierarchical levels within a discrete computer and then forwarded from an event-message-collecting entity within the discrete computer to the monitoring-and-management system. The monitoring-and-management system 1112 may filter and analyze the received event messages, as they are received, in order to detect various operational anomalies and impending failure conditions. In addition, the monitoring-and-management system collects and stores the received event messages in one or more data-storage devices or appliances 1118 as entries in indexed files, databases, and/or other types of data-storage entities 1120. Either through real-time analysis or through analysis of log files, the monitoring-and-management system may detect operational anomalies and conditions for which the monitoring-and-management system displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as alphanumeric parameter 1212 which identifies the particular source of the event.

Figure 13:
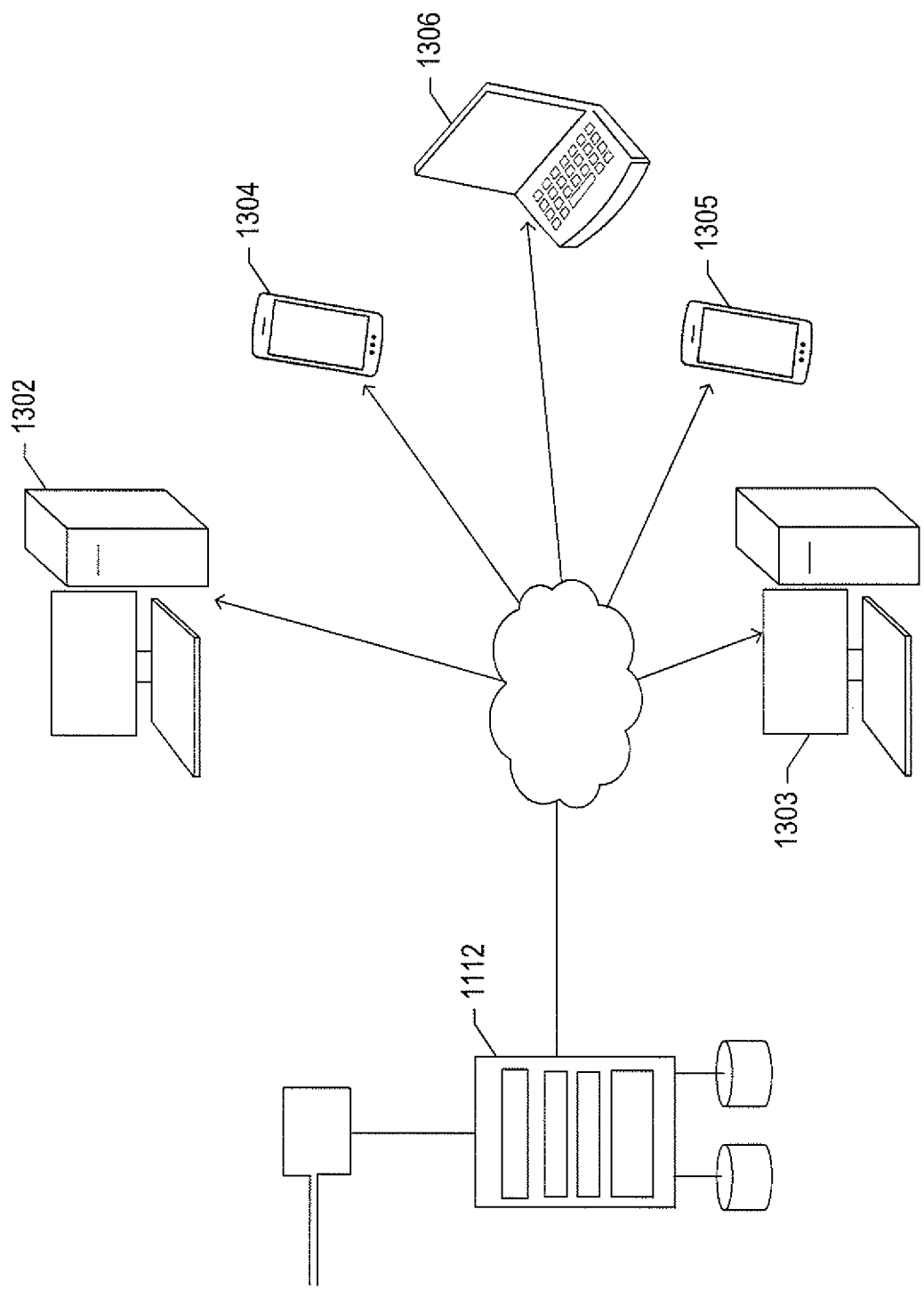
FIG. 13 illustrates the distribution of alerts from a distributed computer system to system-administration-personnel devices.

FIG. 13 illustrates the distribution of alerts from a distributed computer system to system-administration-personnel devices. The monitoring-and-management system 1112, previously discussed with reference to FIG. 11, is shown on the left-hand side of FIG. 13. In addition to logging events corresponding to received event messages, the monitoring-and-management system monitors incoming event messages and initiates generation of alert-messages for certain of the event messages that report the occurrences of serious events that need the attention of system-administration personnel. In certain implementations, the monitoring-and-management system itself includes an alert-generation-and-distribution subsystem to which the event-processing system issues alert-initiation requests, while, in other implementations, the monitoring-and-management system generates alert-initiation messages and transmits the alert-initiation messages to an alert-generation-and-distribution-subsystem component of the distributed computer system or to a remote alert-generation-and-distribution system that distributes alert messages to system-administration-personnel devices. As shown in FIG. 13, alert messages may be distributed to personal computers and workstations 1302-1303, cell phones 1304-1305, laptops and tablets 1306, and to many other types of electronic devices, including pagers and land-line phones. An alert-generation-and-distribution system or subsystem may include complex logic for identifying the appropriate recipients for a particular alert, identifying to which of the recipients' devices to transmit alert messages, identifying times of day at which to send alert messages to particular recipients, and identifying the frequency of alert-message retransmission in the case that alert messages are not received in a timely fashion. Alert messages provide rapid notification to engineers and system administrators of the occurrence of potentially serious events that, if not handled in a timely fashion, may lead to system degradation or failure. In certain systems, alert messages may additionally be sent to automated system-maintenance and system-administration subsystems that can undertake corrective and ameliorative actions for certain types of reported events without human intervention.

Figure 14:
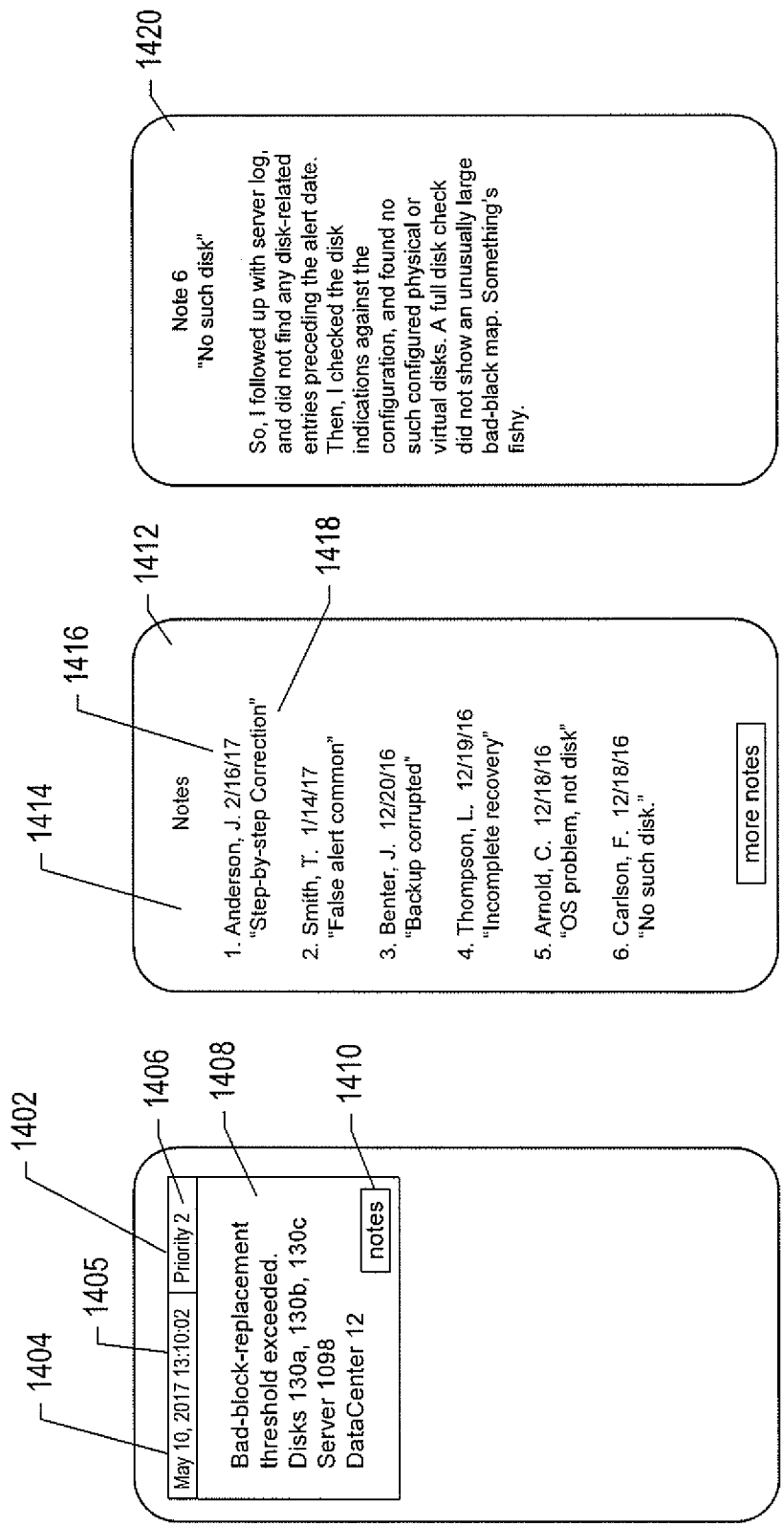
FIG. 14 illustrates the display of an alert message on a system-administration-personnel device.

FIG. 14 illustrates the display of an alert message on a system-administration-personnel device. The alert message 1402 may be displayed in superposition over whatever else is being displayed on the device. The alert message may include a date 1404, a time 1405, an alert-priority indication 1406, a textural description of the event or problem that elicited distribution of the alert message 1408, and a display-notes feature 1410 to which a user may input an indication to display notes associated with the alert message. In the example of FIG. 14, user input to the display-notes feature 1410 results in a display of a list of notes 1412. Each note associated with the alert is summarized by an indication of the individual who submitted the note 1414, a date 1416, and a short title 1418. The list elements are active display elements. When a user inputs an indication to display a particular note to an element of the list representing that note, the note is displayed on the device 1420. The note generally includes a comment, a paragraph, or even a short article describing a user's experience with handling the alert, including how the user remediate the system failure or condition for which the alert was generated, and other relevant observations that may be of use to others. System-administration personnel and other users can enter notes with respect to particular alerts through an alert-system user interface.

Figure 15A:
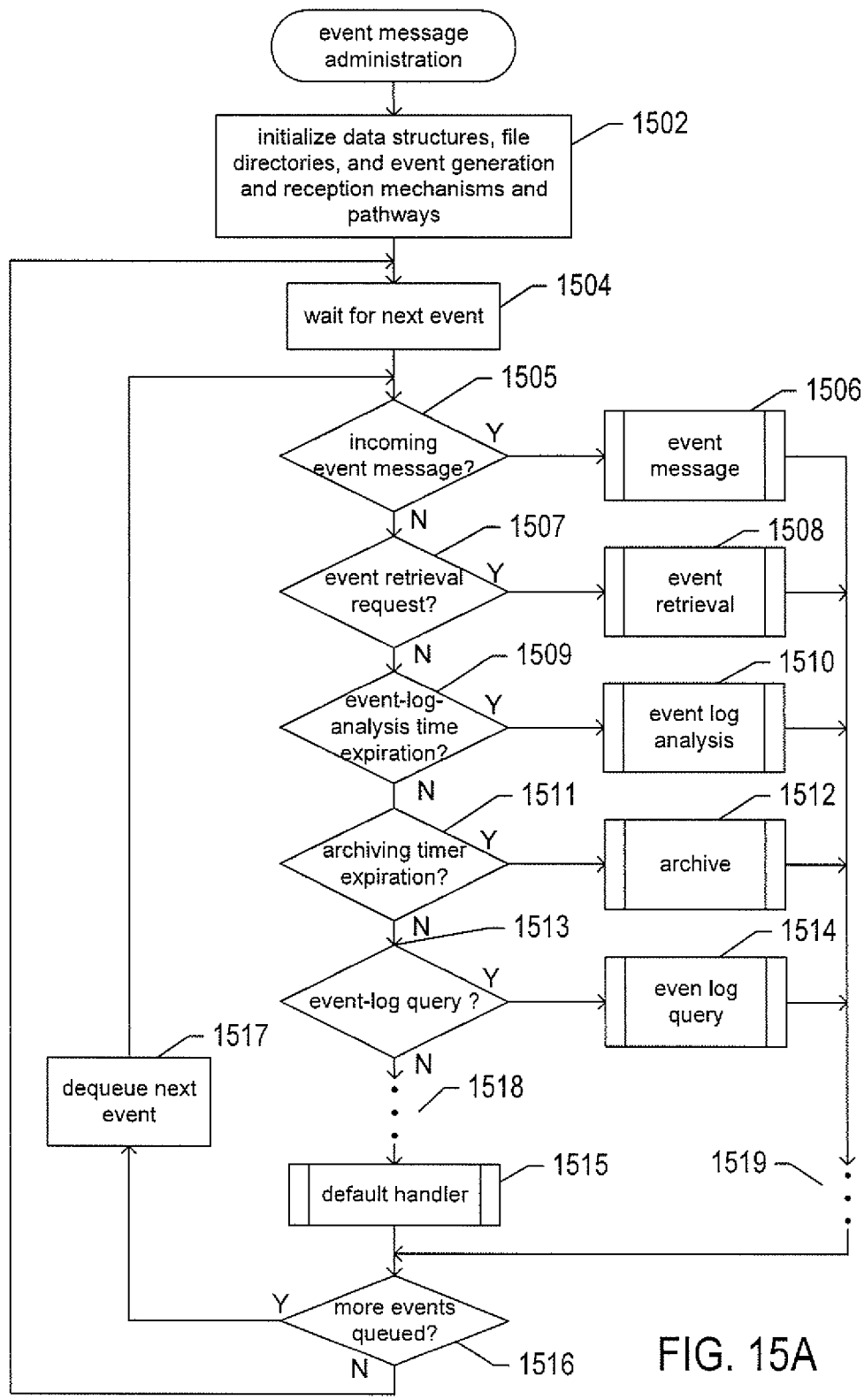
FIGS. 15A-B provide control-flow diagrams that illustrate operation of the monitoring-and-management system shown in FIGS. 11 and 13.
Figure 15B:
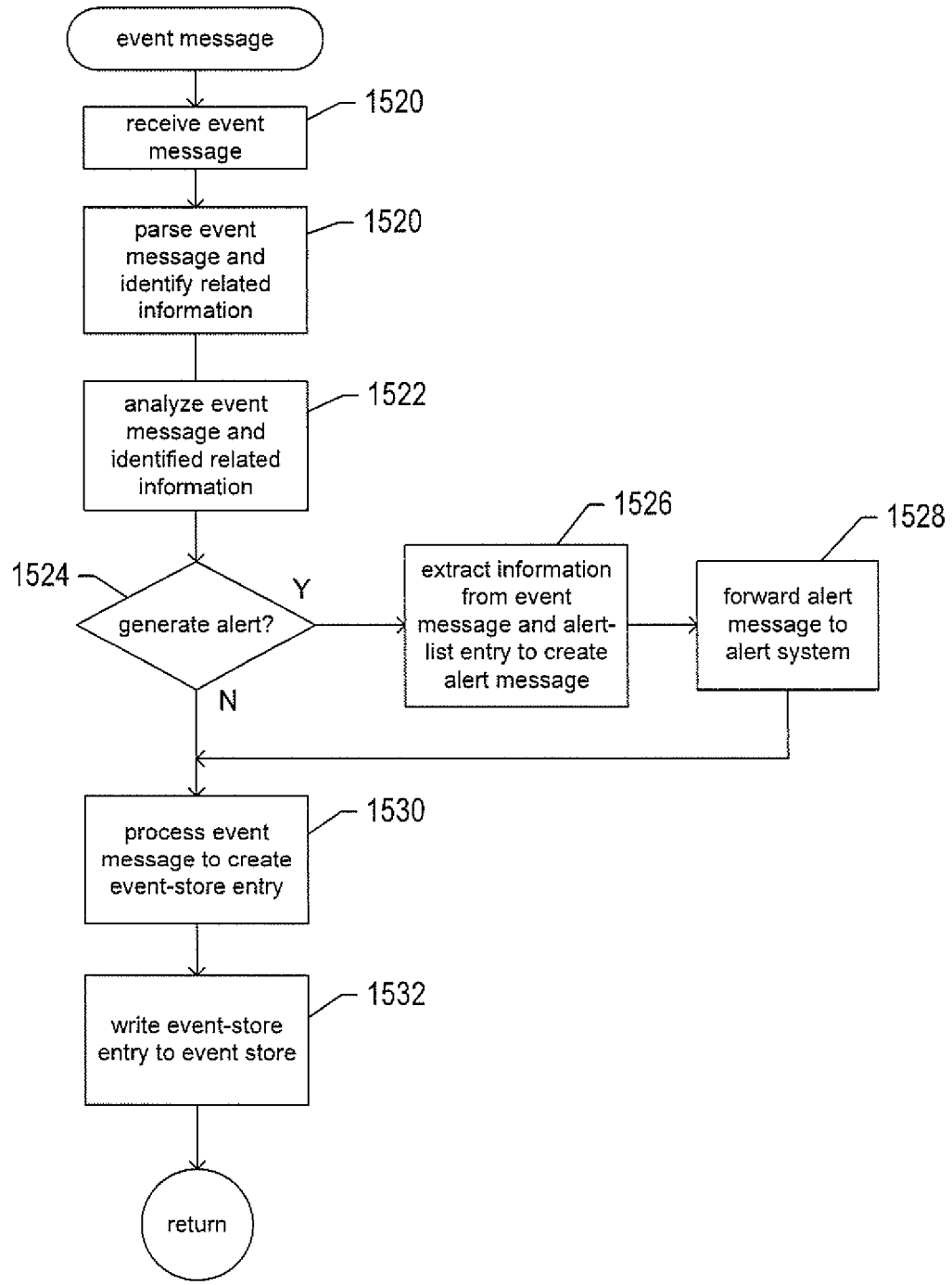

FIGS. 15A-B provide control-flow diagrams that illustrate operation of the monitoring-and-management system shown in FIGS. 11 and 13. FIG. 15A provides a control-flow diagram for an event-message-administration component of the monitoring-and-management system. In step 1502, the event-message-administration component initializes various data structures, file-directory pointers, and event-generation and event-reception facilities. The event-message-administration component then continuously executes an event-handling loop of steps 1504-1517. In step 1504, the event-message-administration component waits for a next event to occur. When the next occurring event is an incoming event message, as determined in step 1505, an event-message handler is called in step 1506. When the next-occurring event is an event-retrieval request received from an event-message-administration user interface, as determined in step 1507, an event-retrieval-request handler is called in step 1508. When the next-occurring event is a timer expiration for a log-analysis timer that indicates when automated analysis of event logs is to be next undertaken, as determined in step 1509, an event-log-analysis handler is called in step 1510. As discussed below, the event-message handler 1506 may generate an alert corresponding to an incoming event message. Similarly, the event-log-analysis handler may generate one or more alerts based on analysis of event logs. Alerts generated by the event-message handler are near-real-time alerts while alerts generated by the event-message-analysis handler are delayed by periods of time of up to the log-analysis timer interval. When the next-occurring event is a timer expiration for an archiving timer that indicates when archiving of current event logs is to be next undertaken, as determined in step 1511, an archive handler is called in step 1512. When the next-occurring event is receipt of an event-log query, as determined in step 1513, an event-log-query handler is called in step 1514. A default handler 1515 handles rare and unexpected events. When there are more events queued for handling, as determined in step 1516, a next event is dequeued, in step 1517, and control returns to step 1505. Otherwise, control returns to step 1504, where the event-message-administration component waits for a next event to occur. Ellipses 1518 and 1519 indicate that many other types of events may be received and handled by the event-handling loop of steps 1504-1513.

FIG. 15B provides a control-flow diagram for the event-message handler called in step 1506 of FIG. 15A. In step 1520, the event-message handler receives the event message. In step 1521, the event-message handler parses the received event message and identifies any available related information that may be useful in analyzes the event message. In step 1522, the event-message handler analyzes the event message, along with any of the identified related information, to determine any administrative actions to undertake as a result of the occurrence of the event corresponding to the event message. For example, the event-message handler may extract an event type from the received event message and look up the event type in an alert list that contains alert-list entries for event-message types for which alerts are generated. When the type of the received event message is found in the alert list, as determined in step 1524, the event-message handler, in step 1526 extracts information from the received event message and the corresponding alert-list entry and creates an alert-initiation message that contains information including an indication of an alert type, source of the alert, date and time that the alert-inducing event occurred, and other such information. In step 1528, the alert-initiation message is forwarded to an alert-generation-and-distribution system or subsystem for distribution to system-administration personnel. Other types of administrative actions may be taken, depending on the event type and other administration parameters. In step 1530, the event-message handler processes the received event message to create an event-store entry and, in step 1532, the event-message handler writes the entry to the event store. Thus, as previously mentioned, in many distributed computing systems, alerts are generated, by an alert-generation-and-distribution system or subsystem, in response to receiving alert-initiation messages, by the alert-generation-and-distribution system or subsystem, from an monitoring-and-management system that transmits alert-initiation messages in response to receiving certain types of event messages. The alert-generation-and-distribution system may be component of the distributed computer system or a remoted system external to the distributed computing system. As mentioned above, alerts may also be generated during periodic analysis of recently stored event-store entries.

Currently available alert-generation-and-distribution systems and subsystems greatly facilitate administration of distributed computer systems, including large data centers. However, currently available alert-generation-and-distribution systems and subsystems have numerous deficiencies. Many of the currently available alert-generation-and-distribution systems are inflexible and inefficient. For example, it is often the case that particular alerts may be generated erroneously, due to programming or event-message-processing errors, may include descriptions that do not well correspond to the underlying events and problems for which the alert is generated, and may be associated with incorrect priorities. The priority associated with an alert may determine when alert messages are sent, to whom alert messages are sent, the frequency of retransmission of alert messages for which no response is received, the device types to which the alerts are sent, and the times of day during which the alert messages are transmitted. When an alert is associated with a higher priority than warranted, occurrence of the alert may result in distraction of already busy and preoccupied system administrators and engineers and/or in significant amounts of wasted effort and time when system administrators, engineers, and other personnel are diverted from their current tasks to diagnose and to attempt to ameliorate problems thought to be associated with the occurrence of the alert. Furthermore, large distributed computer systems, including large physical data centers, are highly dynamic entities that produce gigabytes and even terabytes of log-entry data on a daily basis. An alert-generation-and-distribution system that needs to be reprogrammed or manually reconfigured in order to respond to changing patterns of system behavior is hopelessly unresponsive and fragile in the face of the potential scale and speed of system changes that can render the alert-generation-and-distribution system outdated and uninformative.

Collaborative Alert-Generation-and-Distribution Systems to which the Current Document is Directed The current document discloses a new, flexible, and robust alert-generation-and-distribution system or subsystem that employs user feedback, user-initiated proposals for modifying the alert-generation-and-distribution system, and consensus-based modification-proposal adoption in order to quickly, precisely, and continuously adjust the alert-generation-and-distribution system to track the behavior and operational characteristics of a distributed computer system for which alerts are generated. In essence, the currently disclosed alert-generation-and-distribution system provides a social-networking-like collaborative environment in which system administrators, engineers, and other personnel cooperate to continuously adapt the alert-generation-and-distribution system to current system conditions and characteristics as well as to the current collective understanding of system conditions and characteristics within the collaborative environment.

Figure 16A:
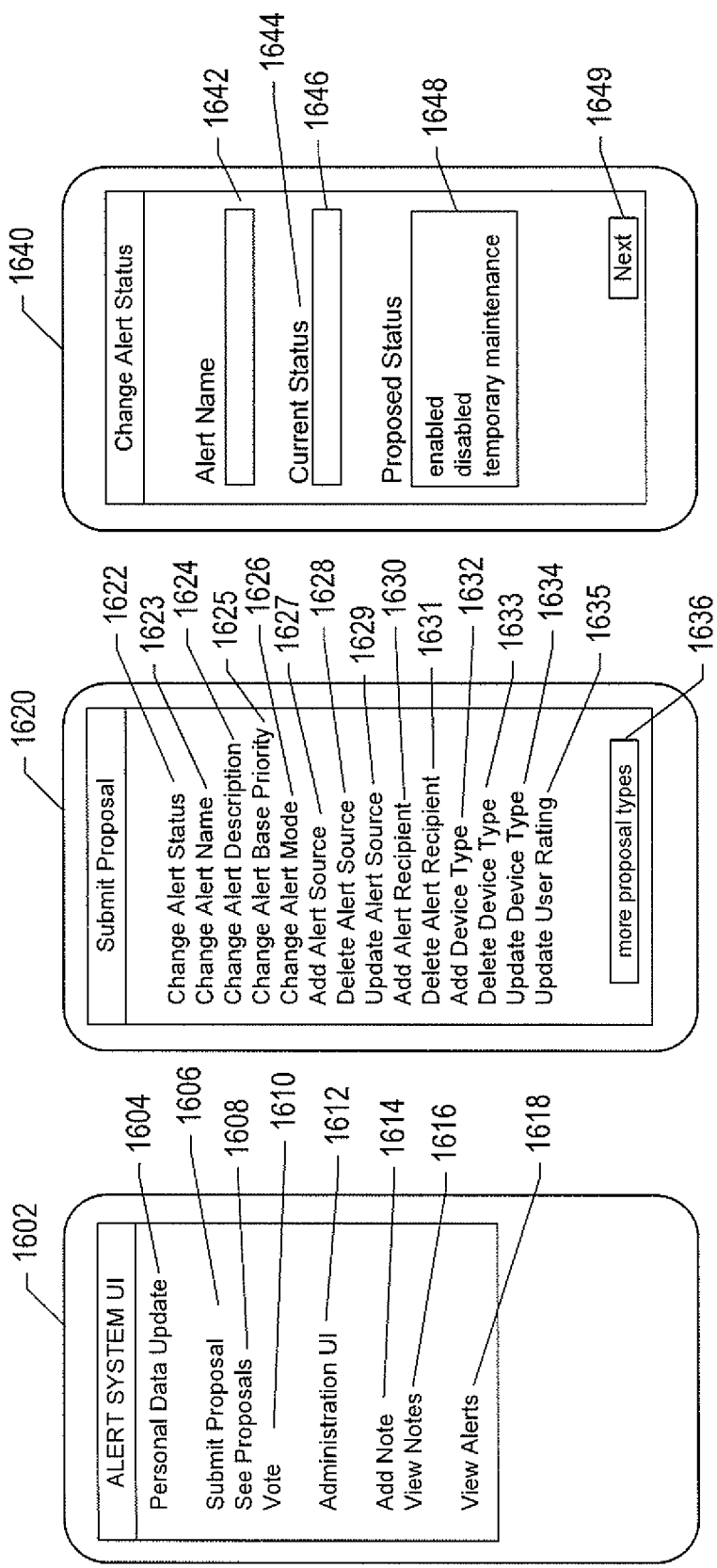
FIGS. 16A-B illustrate, from a user-interface perspective, certain features of the currently disclosed, collaborative alert-generation-and-distribution system or subsystem.
Figure 16B:
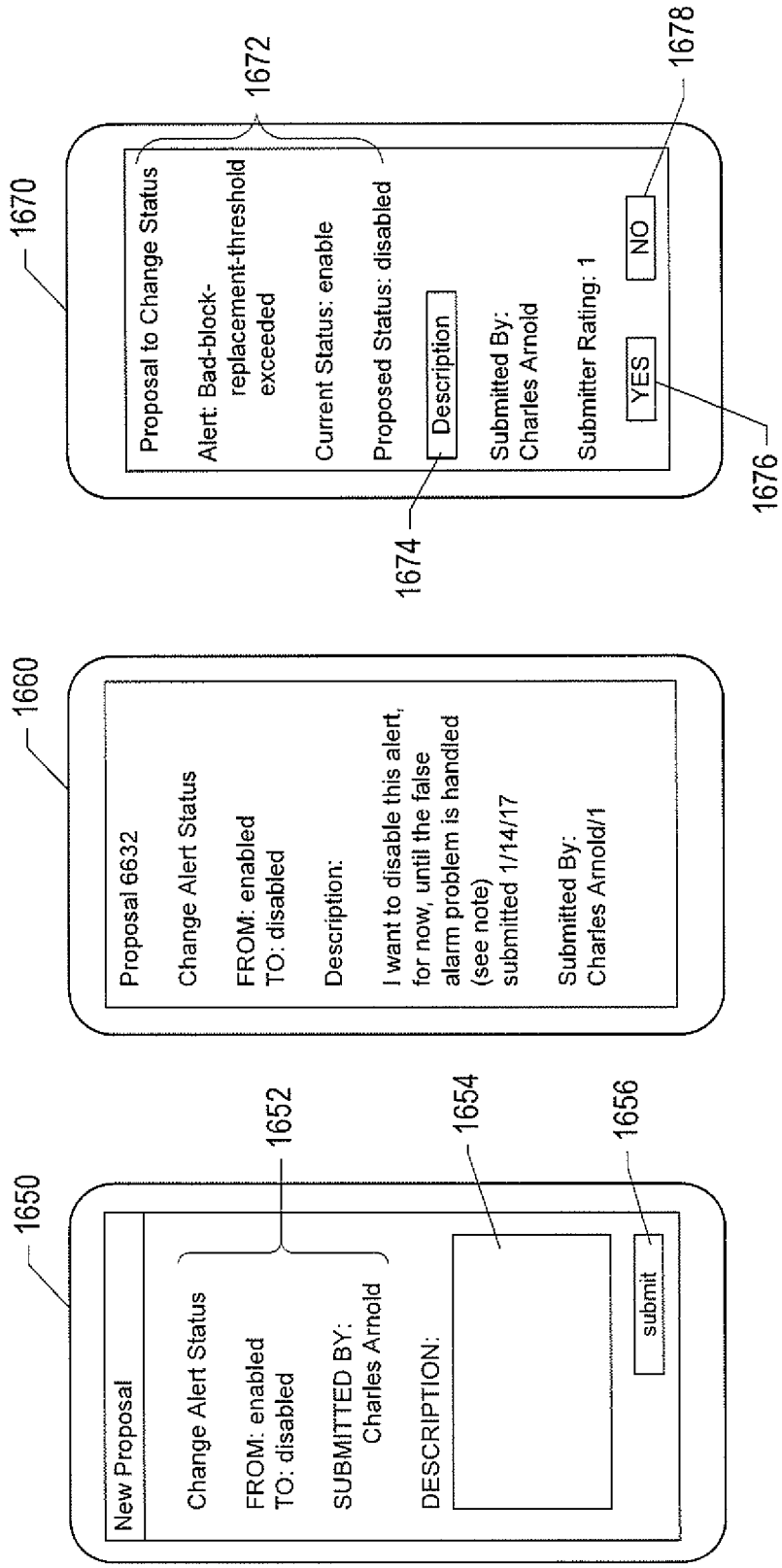

FIGS. 16A-B illustrate, from a user-interface perspective, certain features of the currently disclosed, collaborative alert-generation-and-distribution system or subsystem. In FIGS. 16A-B, a series of display-screen captures, similar to those shown in FIG. 14, are used to illustrate these features. The currently disclosed collaborative alert-generation-and-distribution system provides a user interface ("UI") that can be invoked from any of many different types of user devices. Screen capture 1602 in FIG. 16A shows an example landing page or landing screen for the collaborative-alert-generation-and-distribution-system UI. The UI provides various options to the user, including: (1) an option 1604 to update personal data, such as the user's name, position, user devices, user-device network addresses or other access codes, and other personal information; (2) an option 1606 to submit a proposal to modify the collaborative alert-generation-and-distribution system; (3) an option 1608 to view submitted modification proposals; (4) an option 1610 for voting for or against one or more proposals; (5) an option 1612 to access an administration user interface by authorized administrators; (6) an option 1614 to add a note to a particular type of alert; (7) an option 1616 to view notes previously submitted for association with particular types of alerts; and (8) an option 1618 to view a list of the various different types of alerts that can be generated by the collaborative alert-generation-and-distribution system. Of course, in any particular implementation, the UI may include many additional and/or different options.

Screen capture 1620 illustrates the UI page displayed to a user who selects the "submit proposal" option 1606 from the landing-page menu. The "submit proposal" page lists numerous different types of modifications to the collaborative alert-generation-and-distribution system that can be proposed by a user, including: (1) changing the current status of a particular alert 1622; (2) changing the name of an alert 1623; (3) changing the description of an alert 1624; (4) changing the base priority for an alert 1625; (5) changing a mode associated with an alert 1626; (6) adding a source for an alert 1627; (7) deleting a source from an alert 1628; (8) updating, or editing, a source for an alert 1629; (9) adding a recipient for an alert 1630; (10) deleting a recipient for an alert 1631; (11) adding a new device type 1632; (12) deleting a device type 1633; (13) updating a device type 1634; and (14) updating a user rating 1635. In any given implementation, there may be many different and/or additional proposed modification types. An input feature 1636 is provided to view additional proposed modification types in the example UI shown in FIG. 16A. Of course, in any particular implementation, the above-discussed UI captured may be differently organized. For example, relevant change features, such as the "Change Alert Status" feature, may be arranged near relevant editable objects, such as an editable display window that displays the current alert status. Alternatively, the change features may be displayed in response to user input to relevant display features.

Screen capture 1640 illustrates a "change alert status" page displayed when a user selects the "change alert status" option 1622 displayed in the "submit proposal" UI page. The "change alert status" page includes an input feature 1642 that allows the user to specify the name of an alert, after which the "change alert status" page displays the current status for the alert 1644. A second input feature 1646 allows a user to submit a proposed new status for the alert, with the new status selectable from a status-selection window 1648. When the user inputs a selection-indication to the "next" input feature 1649 of the "change alert status" page, a "new proposal" page is displayed, as shown in screen capture 1650 in FIG. 16B. The "new proposal" page displays information 1652 associated with the status-modification proposal and provides a text-input feature 1654 that allows the user to include a description of the status-modification proposal. For those proposals needing one or more parameter values, discussed further below, parameter-value-specification prompts may be displayed within the text-input feature to prompt the user to supply the needed parameter values. A "submit" input feature 1656 allows a user to submit the finished proposal to the collaborative alertgeneration-and-distribution system or subsystem. User input to the "submit" input feature results in a display of a summary of the proposed modification to the user, as shown in screen capture 1660 in FIG. 16B.

Once a proposed modification has been successfully submitted, the collaborative alert-generation-and-distribution system transmits, in certain implementations, vote-request messages to all or a subset of the users or participants of the collaborative alert-generation-and-distribution system. Screen capture 1670 in FIG. 16B shows an example "vote" page displayed by the collaborative alert-generation-and-distribution system to a user on the user's device following reception, by the device, of a vote-request message. The "vote" page displays information about the proposed modification 1672 and provides a "description" input feature 1674 to allow a user to display the description for the proposed modification in an additional screen. Two voting input features 1676 and 1678 allow a user to input a vote for or against the proposed modification. When votes are submitted, as further discussed below, the collaborative alert-generation-and-distribution system, depending on a current mode for the alert for which the modification is submitted or, for non-alert modifications, a modification mode associated with the proposed modification, either automatically carries out the proposed modification, when the submitted votes indicate a consensus among alert-generation-and-distribution-system participants in favor of the modification, or discards the proposed modification, when the submitted votes indicate a lack of consensus in favor of the modification. In certain cases, the mode associated with an alert or a proposed modification may indicate that, rather than automatically accepting a proposal, the collaborative alert-generation-and-distribution system forwards a user-accepted proposal to a system administrator or other individual or group of individuals for final authorization and implementation. Vote-request messages may be sent out immediately, following submission of a proposal, or may be sent out at parameter-specified times. Different subsets of users may receive vote-request messages for different types of proposed modifications or for proposed modifications to different alerts. For example, in certain implementations, only those users who are designated as before/after modification recipients for a particular alert may be requested to vote on proposed modifications to that alert. When a sufficient number of responses to a vote-request message are not yet received, the collaborative alert-generation-and-distribution system may retransmit the vote-request message to unresponsive users. In addition, users may submit votes independently of receiving vote-request messages through the UI (1610 in FIG. 16A).

Figure 17A:
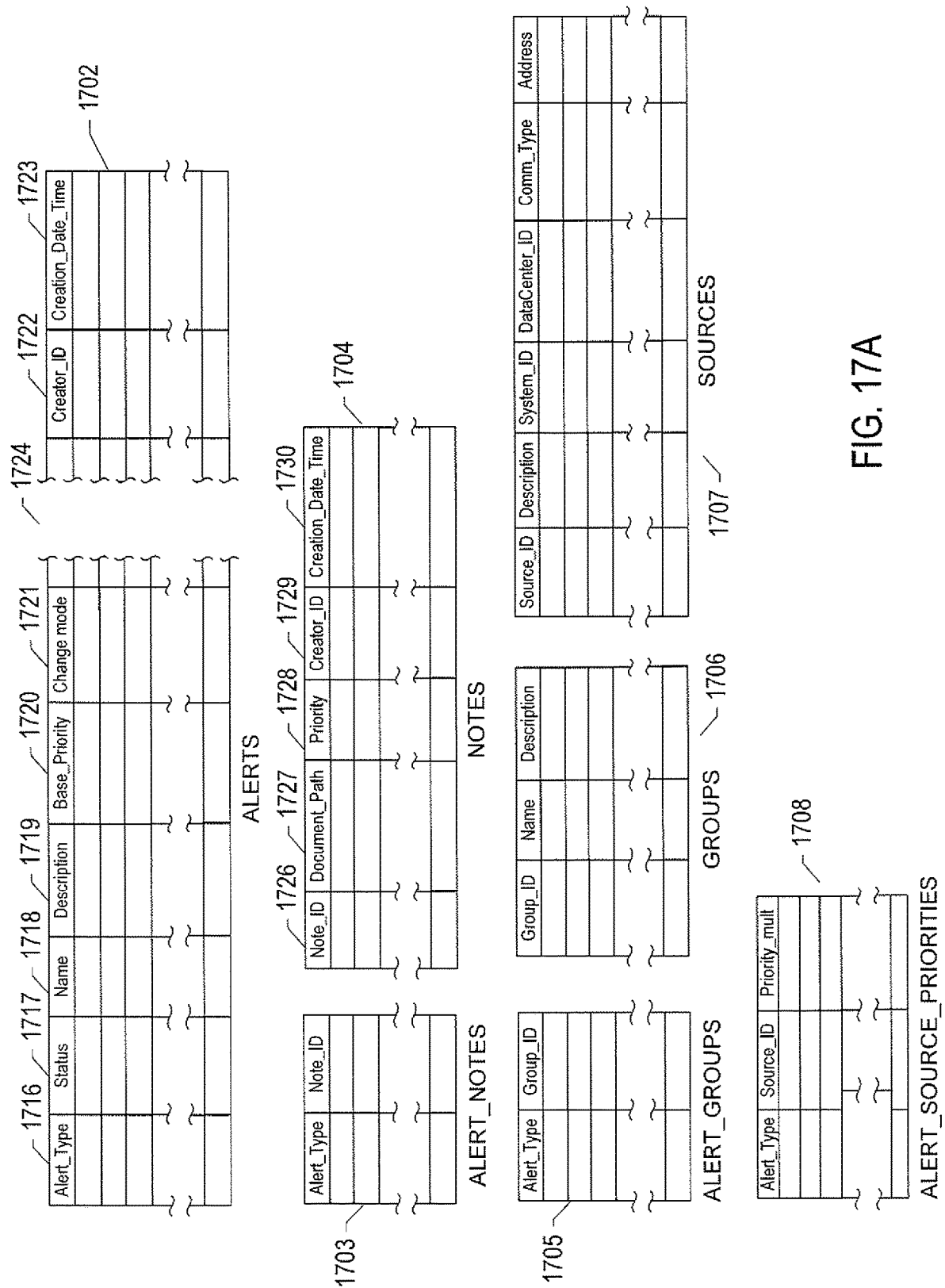
FIGS. 17A-B show a number of relational-database tables that represent the stored data that is maintained by the collaborative alert-generation-and-distribution system and that is used for alert distribution, proposed-modification submission, voting for or against proposed modifications, and other functionalities and facilities provided by the collaborative alert-generation-and-distribution system.
Figure 17B:
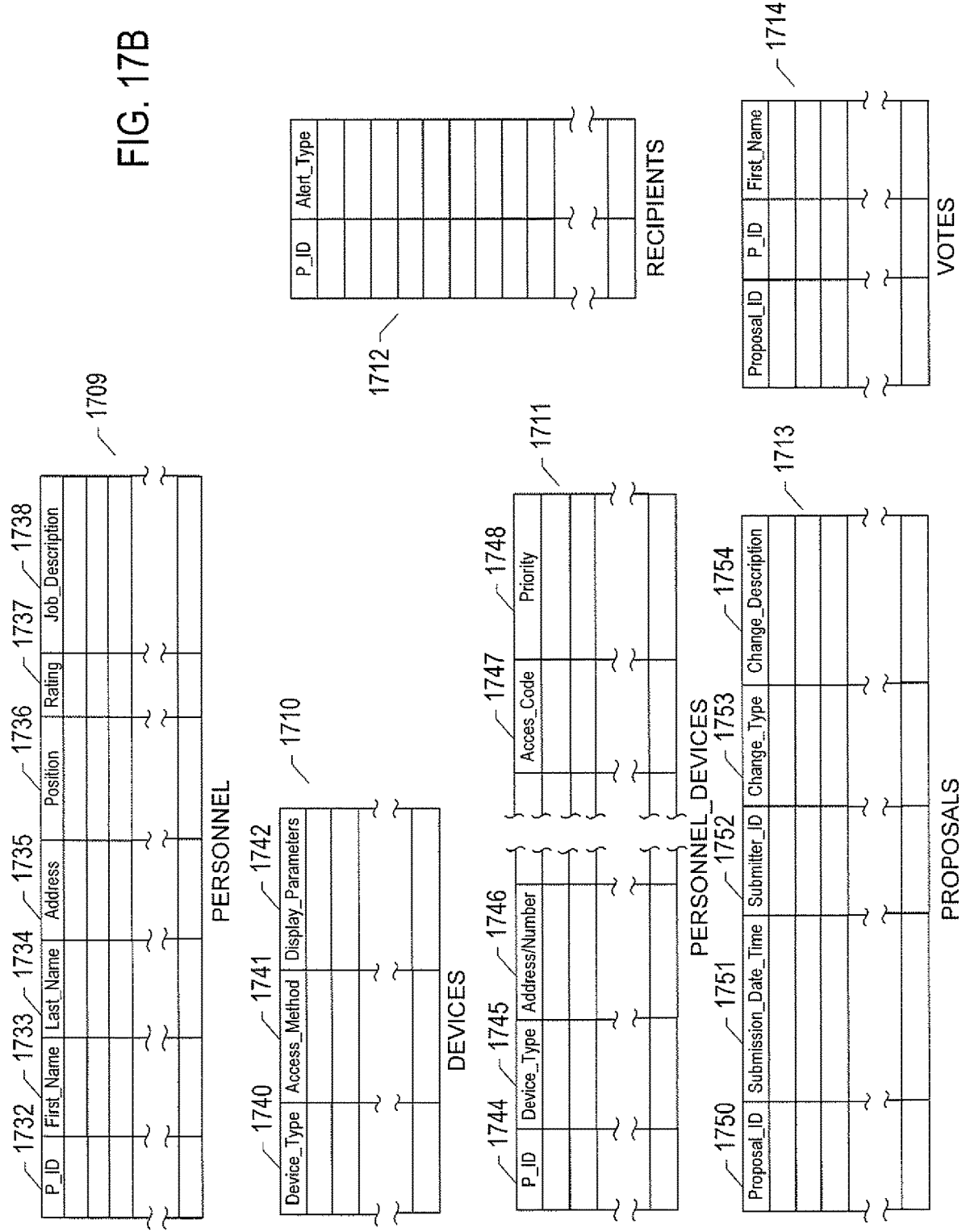

Next, an implementation of the collaborative alert-generation-and-distribution system or subsystem to which the current document is directed can be described using a relational-database schema and control-flow diagrams. This is, of course, an example implementation. Alternative implementations can use other types of databases or data-storage functionalities. FIGS. 17A-B show a number of relational-database tables that represent the stored data that is maintained by the collaborative alert-generation-and-distribution system and that is used for alert distribution, proposed-modification submission, voting for or against proposed modifications, and other functionalities and facilities provided by the collaborative alert-generation-and-distribution system. FIG. 17A shows representations of seven relational-database tables. These tables include: (1) ALERTS 1702, each row of which represents a different alert generated and distributed by the collaborative alert-generation-and-distribution system; (2) ALERT_NOTES 1703, each row of which represents the association of a particular note with a particular type of alert; (3) NOTES 1704, each row of which represents a note associated with one or more alerts; (4) ALERT_GROUPS 1705, each row of which represents the association of a particular type of alert with a particular alert group; (5) GROUPS 1706, each row of which represents a group of alerts; (6) SOURCES 1707, each row of which represents a component, subcomponent, or subsystem of a distributed computer system that initiates events that are communicated to, and collected by, the monitoring-and-management system and that result in alert initiation; (7) ALERT_SOURCE_PRIORITIES 1708, each row of which represents a priority-modification term applied to the base priority of a particular alert for a particular source of the alert. FIG. 17B shows representations of six additional relational-database tables, including: (1) PERSONNEL 1709, each row of which represents a user or participant in the collaborative alert-generation-and-distribution system or subsystem; (2) DEVICES 1710, each row of which represents a type of the user device; (3) PERSONNEL_DEVICES 1711, each row of which represents a particular user device owned by, or associated with, a particular participant; (4) RECIPIENTS 1712, each row of which represents a participant who receives a particular type of alert; (5) PROPOSALS 1713, each row of which represents a proposal for modifying the alert-generation-and-distribution system; and (6) VOTES 1714, each row of which represents a vote, by a participant, for or against a particular proposal. The tables shown in FIGS. 17A-B represent a subset of the information generally stored and maintained by the currently disclosed collaborative alert-generation-and-distribution system. This subset of information is sufficient to describe, below, the implementation of significant features of the currently disclosed collaborative alert-generation-and-distribution system.

The table ALERTS includes the following columns: (1) Alert_Type 1716, a unique identifier for each alert represented by a row in the table ALERTS; (2) Status 1717, the current status for an alert, which may include enabled, disabled, and temporary maintenance; (3) Name 1718, a natural-language name for the alert; (4) Description 1719, a textural description of the alert, including parameter values for an alert associated with one or more parameters, discussed below; (5) Base_Priority 1720, the base priority for the alert; (6) Change_Mode 1721, an indication of how the various values associated with the alert, including the values represented by columns in the table alerts, are modified; (7) Creator_ID 1722, the unique identifier for a participant that created the alert; and (8) Creation_Date_Time 1723, an indication of the date and time when the alert type was created. The broken cell 1724 indicates that there may be additional columns in any particular implementation of the ALERTS table. Of course, in different implementations of the collaborative alert-generation-and-distribution system, any of the currently discussed relational-database tables may have fewer, more, and/or different columns, and the collaborative alert-generation-and-distribution system may use fewer, more, or different tables.

The table NOTES includes the following columns: (1.) Note_ID 1726, a unique identifier for the note represented by a row in the table NOTES; (2) Document_Path 1727, a file-system path for a document that contains the note; (3) Priority 1728, a display priority associated with the note that determines the order in which the note is listed when the notes associated with an alert are displayed to a user (1412 in FIG. 14); (4) Creator_ID 1729, the unique identifier for the participant who created the note; and (5) Creation_Data_ Time 1730, the data and time when the note was created.

The table PERSONNEL includes the following columns: (1) P_ID 1732, a unique identifier for a participant or user represented by a row of the table PERSONNEL; (2) First_ Name 1733, the first name of the participant; (3) Last_Name 1734, the last name of the participant; (4) Address 1735, an address for the participant; (5) Position 1736, the participant's in job title; (6) Rating 1737, a participant rating reflective of the consensus value of the participant's notes, modification proposals, and other collaborative activities; and (7) Job_Description 1738, a short description of the participant's role in the collaborative alert-generation-and-distribution system.

The table DEVICES includes the following columns: (1) Device_Type 1740, a unique identifier for a device type represented by a row in the table DEVICES; (2) Access_ Method 1741, an indication of how the device is accessed; and (3) Display_Parameters 1742, a list of one or more display parameters that control generation and formatting of UI pages and other information sent to the device by the alert-generation-and-distribution system.

The table PERSONNEL_DEVICES includes the following columns: (1) P_ID 1744, the identifier for the participant owner of the device; (2) Device_Type 1745, an identifier for the type of the device; (3) Address/Number 1746, the IP address, telephone number, or other communications address used to access the device; (4) Access_Code 1747, an access code that may be needed to access the device; and (5) Priority 1748, an indication of the priority for accessing the particular device among all of the devices by which a particular user can be reached. [0043] The table PROPOSALS includes the following columns: (1) Proposal_ID 1715, a unique identifier for the modification proposal represented by a row in the table PROPOSALS; (2) Submission_Date_ Time 1751, a date and time when the proposal was submitted; (3) Submitter_ID 1752, a unique identifier for the participant who submitted the proposal; (4) Change_Type 1753, the type of the proposal, including the types listed in screen capture 1620 shown in FIG. 16A; and (5) Change_ Description 1754, the description furnished in the description input window 1654 shown in screen capture 1650 of FIG. 16B. The meanings of the columns of the remaining tables are either self-evident from the column names or unneeded in the following discussion.

Relational database tables are accessed and manipulated using a query language, such as the structured query language ("SQL"). FIG. 18 provides a number of examples of SQL queries in the context of the relational database tables shown in FIGS. 17A-B. The create-table query 1802 creates the GROUP_ID table (1706 in FIG. 17A). The select query 1804 retrieves the name and description from the ALERTS table for an alert with unique alert type equal to 361. The select query 1806 retrieves the value of the Priority_mult field from the ALERT_SOURCE_PRIORITIES table and the Name field from the ALERTS table for the alert with alert type 361. This is an example of a join query which involves logically combining the two tables ALERTS and ALERT_SOURCE_PRIORITIES in order to retrieve the desired information. The insert query 1808 inserts a new row into the VOTES table. The create-procedure query 1810 creates a routine, or stored procedure, Vote, that is stored within the database management system that maintains the relational database tables and that supports query processing for accessing and manipulating the relational database tables. The Vote routine takes, as arguments, an integer parameter 1812 and a Boolean parameter 1814 and uses the input parameter values to create and insert a new row into the Votes table. The execute query 1816 invokes the stored procedure Vote, created by the create-procedure query 1810, to add a new row to the VOTES table with field values Proposal_ID=4621, P_ID=13, and Vote=TRUE. The delete query 1818 deletes all rows from the VOTES table with field value Proposal_ID=4621. The update-alerts query 1820 changes the value of the field Description in the row of the ALERTS table with field value Alert_Type=203. Thus, SQL queries can be used to create and delete tables, create and delete stored procedures, retrieve information from tables, change information stored in tables, add and delete rows from tables, and carry out other data-retrieval and data-manipulation operations. In the control-flow diagrams discussed below, it is assumed that access to stored information within the relational database tables maintained by the collaborative alert-generation-and-distribution system is carried out via SQL queries. Of course, any of many other data-storage and data-manipulation methodologies can be used in place of a relational database system and SQL queries in alternative implementations of the collaborative alert-generation-and-distribution system.

Figure 19A:
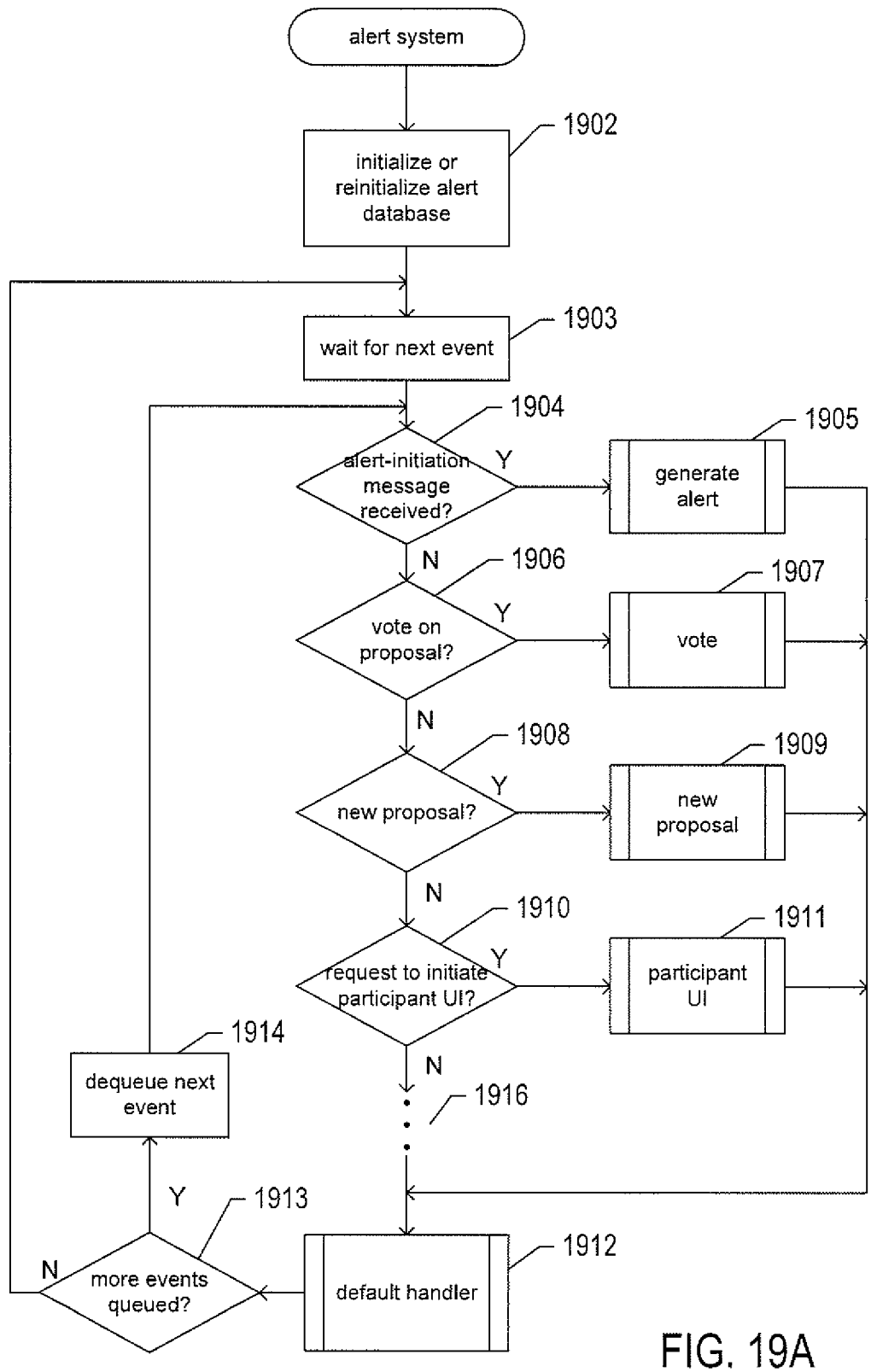
FIGS. 19A-F provide control-flow diagrams that illustrate portions of an implementation of the currently disclosed collaborative alert-generation-and-distribution system.

FIGS. 19A-F provide control-flow diagrams that illustrate portions of an implementation of the currently disclosed collaborative alert-generation-and-distribution system. FIG. 19A provides a control-flow diagram for an event loop that underlies the described implementation of the collaborative alert-generation-and-distribution system. In step 1902, the database system used to store the above-discussed relational database tables is initialized or reinitialized, where reinitialization involves launching the database management system and verifying that the above-discussed tables have been created. Then, the collaborative alert-generation-and-distribution system continuously executes the event-handling loop of steps 1903-1914. In step 1903, the collaborative alert-generation-and-distribution system waits for the occurrence of a next event. When the next-occurring event represents reception of an alert-initiation message, as determined in step 1904, a generate-alerts event handler is called, in step 1905. When the next-occurring event is a reception of a vote for or against a proposed modification, as determined in step 1906, a vote event handler is called in step 1907. When the next-occurring event is a selection, through the UI, for the option of submitting a new proposed modification and collection of information for the proposed modification through the UI, as determined in step 1908, a new-proposal event handler is called, in step 1909. When the next-occurring event is a request, received from a user device, to display the UI home page, as determined in step 1910, a participant-UI event handler is called in step 1911. Ellipses 1916 indicate that many other types of events may be handled by the event loop. A default handler 1912 handles any unexpected or rare events. When more events have been queued for handling, as determined in step 1913, a next event is dequeued, in step 1914, and control returns to step 1904. Otherwise, control returns to step 1903, where the collaborative alert-generation-and-distribution system waits for a next event to occur.

Figure 19B:
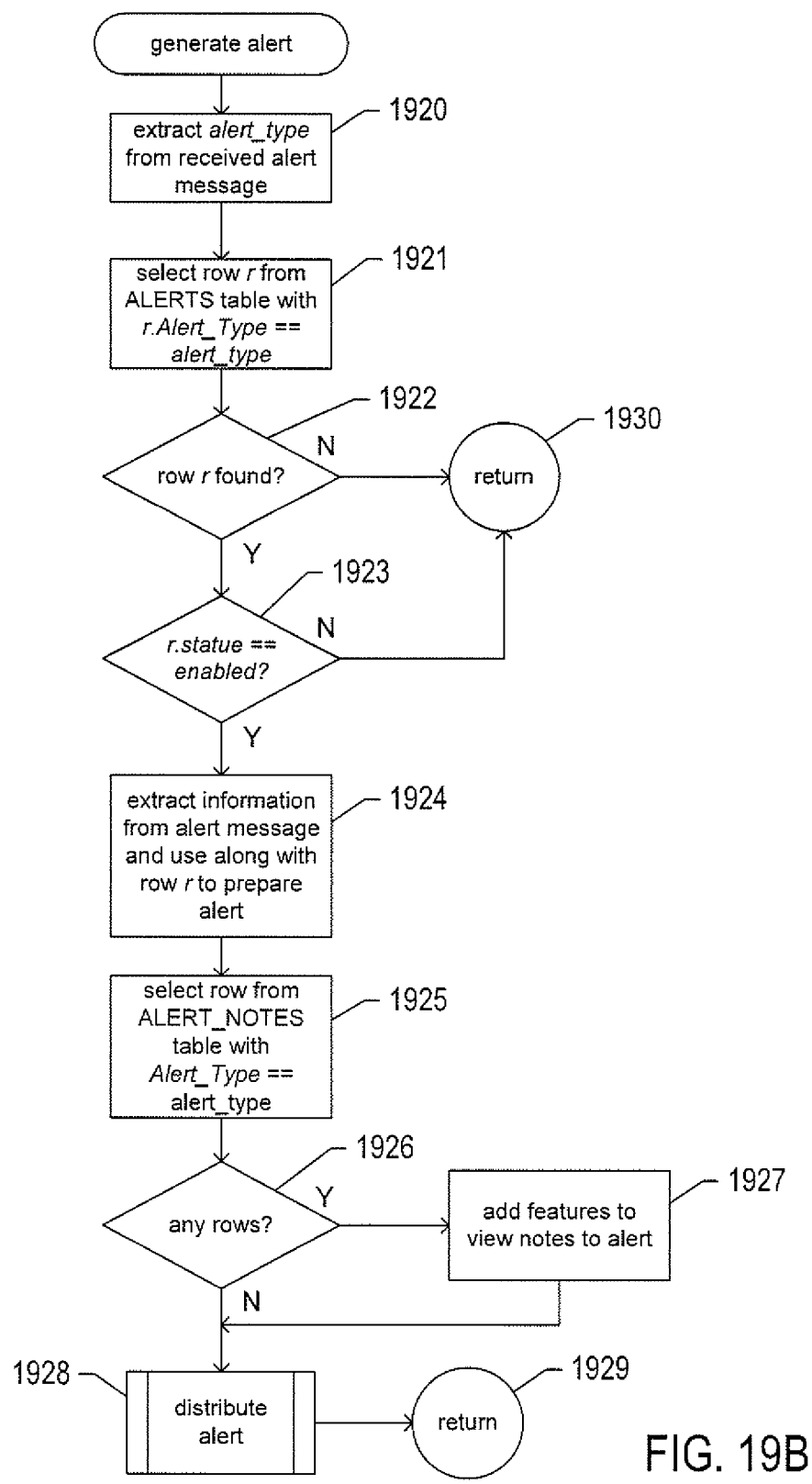

FIG. 19B provides a control-flow diagram for the generate-alert event handler, called in step 1905 of FIG. 19A. In step 1920, the generate-alert handler extracts an alert type from the received alert-initiation message. As discussed above, alert-initiation messages are received from the previously discussed monitoring-event-management system that receives and handles event messages from components within the distributed computer system and that transmits alert-initiation messages for certain of the received events to the collaborative alert-generation-and-distribution system. In step 1921, the generate-alert handler selects a row r from the ALERTS table with the field value r.Alert_Type equal to the alert type extracted from the received alert message. When a row r is found by the select statement, as determined in step 1922, and when the field r.Status of row r has a value enabled, as determined in step 1923, the generate-alert handler extracts any additional information included in the alert-initiation message and uses this additional information, along with the values of the fields of row r, to prepare an alert for distribution to participants, in step 1924. In step 1925, the generate-alert handler attempts to select a row from the table ALERT_NOTES with a field value Alert_Type equal to the alert type extracted from the received alert message. When a row is found in the ALERT_NOTES table, as determined in step 1926, a display-notes feature (1410 in FIG. 14) is added to the alert, in step 1927. The handler generate-alert then calls the routine "distribute alert," in step 1928, to distribute the alert to collaborative-alert-generation-and-distribution-system participants and returns, in step 1929. When there is no row in the ALERTS table corresponding to the extracted alert type or when the status of the alert is not enabled, as determined in steps 1922 and 1923, the generate-alert handler returns, in step 19230

Figure 19C:
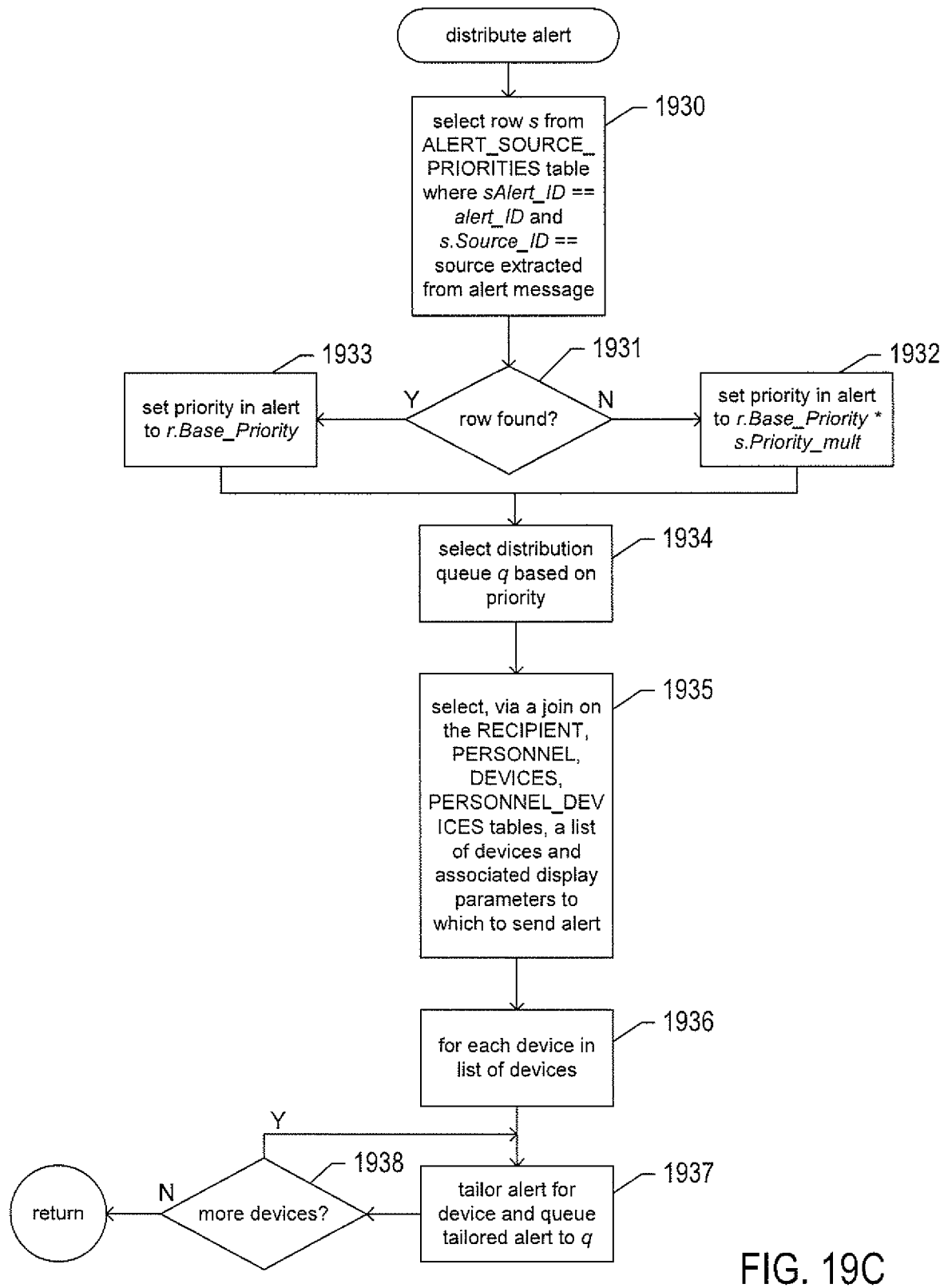

FIG. 19C provides a control-flow diagram for the routine "distribute alert," called in step 1928 of FIG. 19B. In step 1930, the routine "distribute alert" selects a row s from the table ALERT_SOURCE_PRIORITIES with the field value s.Alert_Type equal to the alert type extracted from the received alert message, in step 1920 of FIG. 19B, and with field value s.Source_ID equal to an indication of the source of the alert message extracted from the alert message in step 1924 of FIG. 19B. When a row s found, as determined in step 1931, the routine "distribute alert," in step 1932, sets the priority of the alert to the base priority for the alert, stored in the field r.Base_Priority, multiplied by the value of the field s.Priority_mult. Otherwise, in step 1933, the priority of the alert is set to the base priority and field r.base_priority. In step 1934, the distributed-alert handler selects a distribution queue q onto which to queue the alert for distribution. Selection of the distribution queue is based on the priority assigned to the alert in step 1932 or 1933. In step 1935, the routine "distribute-alert" uses a join-type select query, involving a join of the tables RECIPIENTS, PERSONNEL, DEVICES, and PERSONNEL_DEVICES, to obtain a list of devices and associated display parameters to which to send the alert. In the for-loop of steps 1936-1938, the distributed-alert routine queues a version of the alert in an alert message to the output queue q selected in step 1934 for each device in the list of devices. Each alert message contains alert information that is tailored for display on a particular device, using the display parameters for that device obtained in step 1935.

Figure 19D:
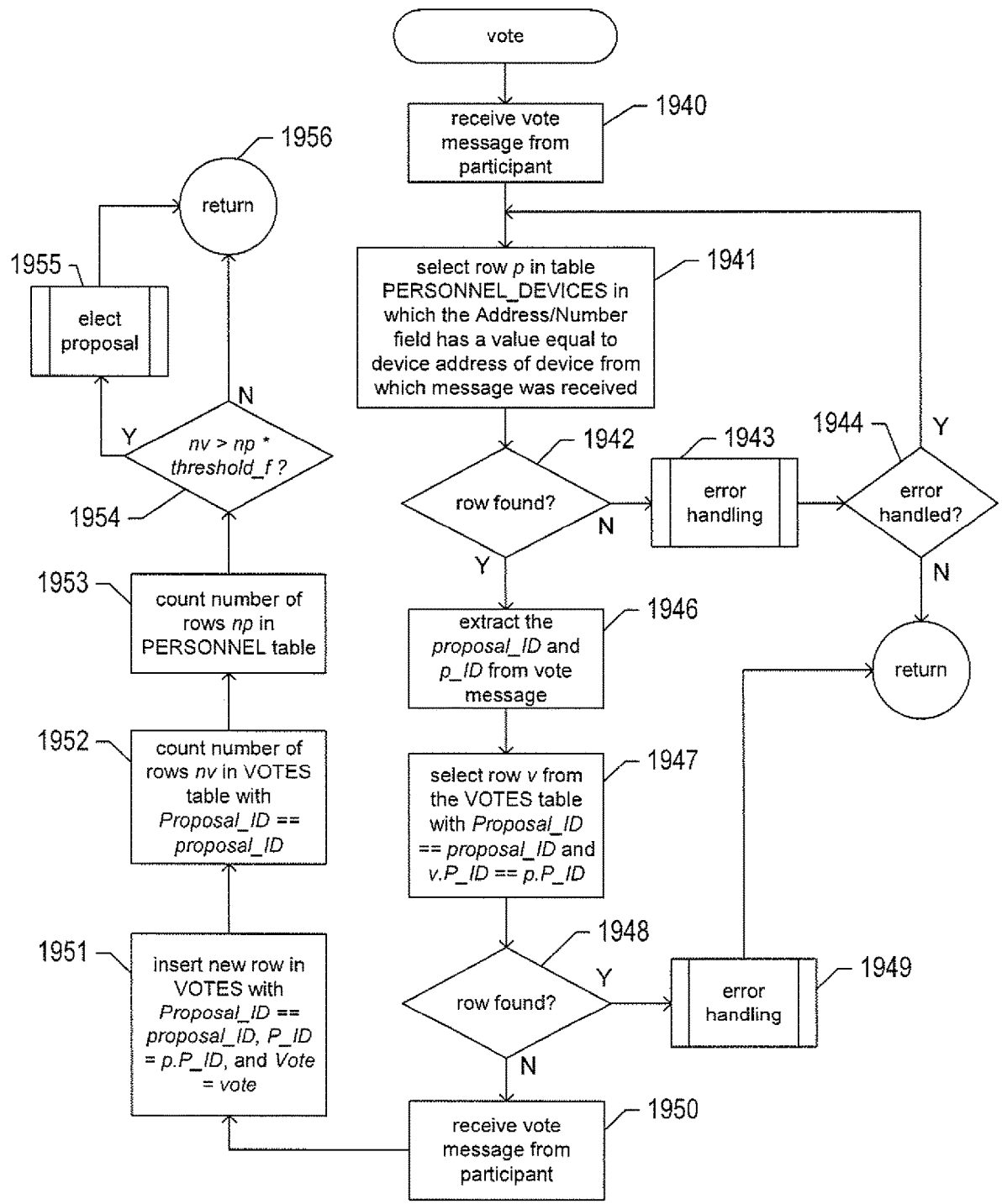

FIG. 19D provides a control-flow diagram for the vote event handler called in step 1907 of FIG. 19A. In step 1940, the vote handler receives a vote message sent by a participant. In step 1941, the vote handler selects a row p from the PERSONNEL_DEVICES table with the field value Address/Number equal to the device address of the device from which the vote message was received. When a row p is not found, as determined in step 1942, an error-handling routine is called, in step 1943. This error may occur, for example, when information about a new device has not yet been entered into the PERSONNEL_DEVICES table. When the error is successfully handled, as determined in step 1944, control returns to step 1941 to again attempt to select a row p from the table PERSONNEL_DEVICES. When the error is not successfully handled, the vote handler returns, in step 1945. When a row p is found, the vote handler extracts the proposal identifier and the user's unique identifier, in step 1946, from the vote message received in step 1940. In step 1947, the vote handler attempts to select a row v from the VOTES table with field value Proposal_ID equal to the extracted proposal identifier and with the field P_ID equal to the participant's identifier extracted from the received vote message. If a row v is found, as determined in step 1948, an error handling routine is called, in step 1949, to handle the fact that a participant appears to have attempted to vote two or more times for the proposal. Otherwise, in step 1950, the vote handler extracts a vote from the vote message and, in step 1951, inserts a new row in the VOTES table corresponding to the extracted vote. In step 1952, the vote handler uses a select statement to count the number of rows nv in the VOTES table that have the field value Proposal_ID equal to the extracted proposal identifier. In step 1953, the vote handler uses a select statement to count the number of rows np in the PERSONNEL table or the number of rows np in a subset of the rows in the PERSONNEL table representing those users who are designated as respondents to the proposal. When nv is greater than np multiplied by a threshold fractional value, as determined in step 1954, a sufficient number of votes have been accumulated for the proposed modification to determine whether or not to implement the proposed modification by calling a routine "elect proposal," in step 1955. Otherwise, the vote handler returns, in step 1956. The currently described implementation assumes that all participants vote for all proposals.

Figure 19E:
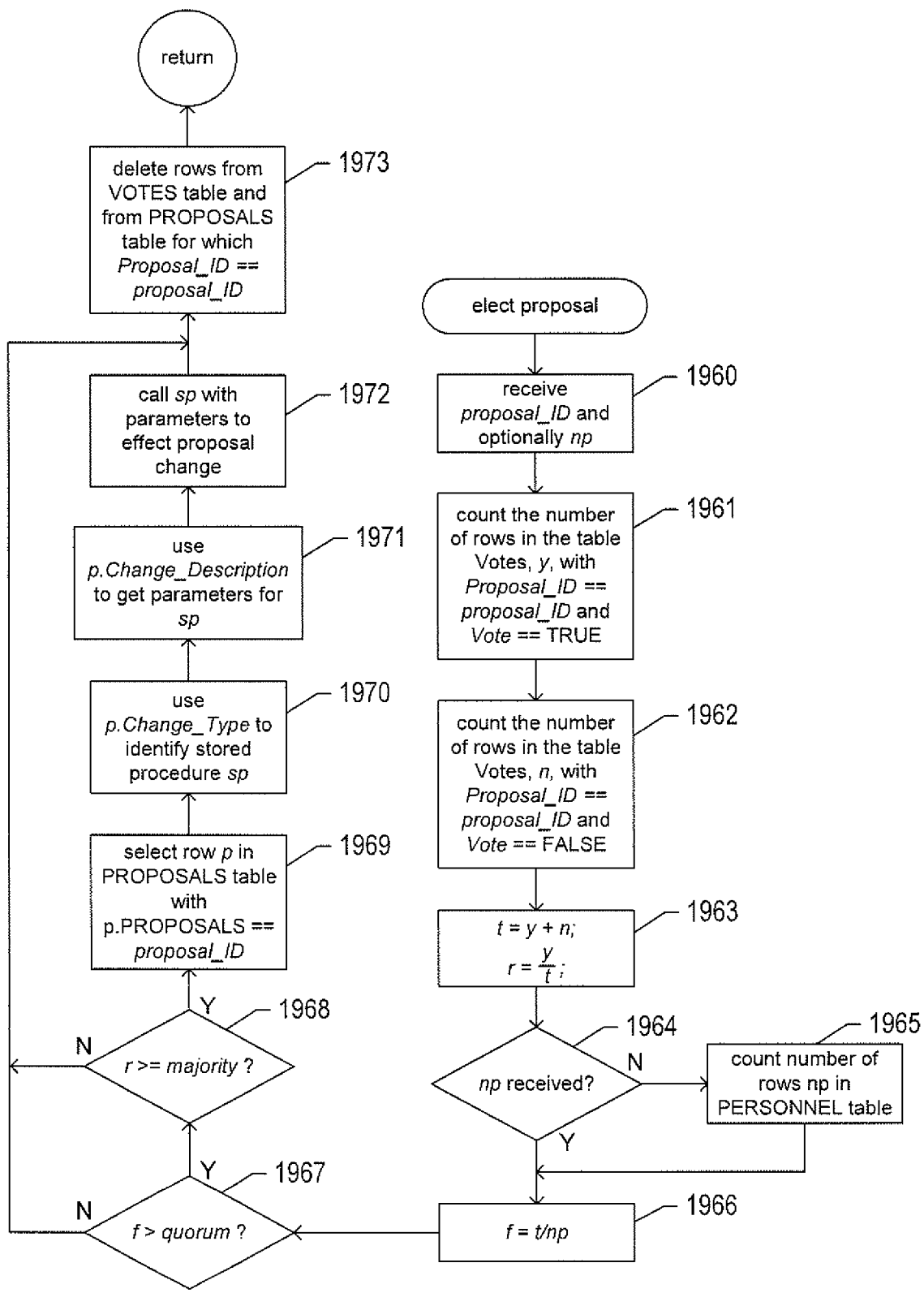

FIG. 19E provides a control-flow diagram for the routine "elect proposal," called in step 1955 of FIG. 19D. The routine "elect proposal" may also be called from the event-handling loop of steps 1903-1914 in FIG. 19A in response to an occurrence of a proposal-timeout timer expiration. In step 1960, the routine "elect proposal" receives a proposal identifier and, optionally, the value np determined in step 1953 of FIG. 19D. In step 1961, the routine "elect proposal" uses a select statement to count the number of rows y in the VOTES table with field values Proposal_ID equal to the received proposal identifier and with field value Vote equal to TRUE. In step 1962, the routine "elect proposal" counts the number of rows n in the VOTES table with the field value Proposal_ID equal to the received proposal identifier and with the field value Vote equal to FALSE. In step 1963, the routine "elect proposal" computes the total number of votes for the proposal, t, as the sum of y and n. In addition, the ratio r of "yes" votes to total votes is computed. When the argument np has not been passed to the routine "elect proposal," as determined in step 1964, a local variable np is set to the number of rows in the PERSONNEL table, in step 1965. A fraction f of participants who have submitted votes for the proposal is determined, in step 1966. When the fraction f is greater than a quorum fraction, as determined in step 1967, and when the ratio r is greater than or equal to a ratio that defines a majority, as determined in step 1968, the proposal has received a sufficient number of "yes" votes to represent a consensus of the participants for making the proposed modification. Otherwise, the proposal has failed. When the proposal has succeeded, the routine "elect proposal," in step 1969, selects a row p in the PROPOSALS table with the field value p.Proposals equal to the received proposal identifier. The field value p.Change_Type in the selected row p is used to identify a stored procedure sp, in step 1970. In step 1971, information in the Change_Description field of the row p is used to access any parameters included in the description of the proposal needed for calling the stored procedure sp. In step 1972, the stored procedure sp is called with the parameter values obtained, in step 1971, to effect the proposed modification. Proposed modifications are carried out, in the described implementation, using stored procedures, with each different type of proposed modification associated with a stored procedure that carries out the modification. Finally, in step 1973, rows in the VOTES tables corresponding to votes for the currently considered proposal and the row in the table PROPOSALS representing the currently considered proposal are deleted if not needed for audit purposes.

Figure 19F:
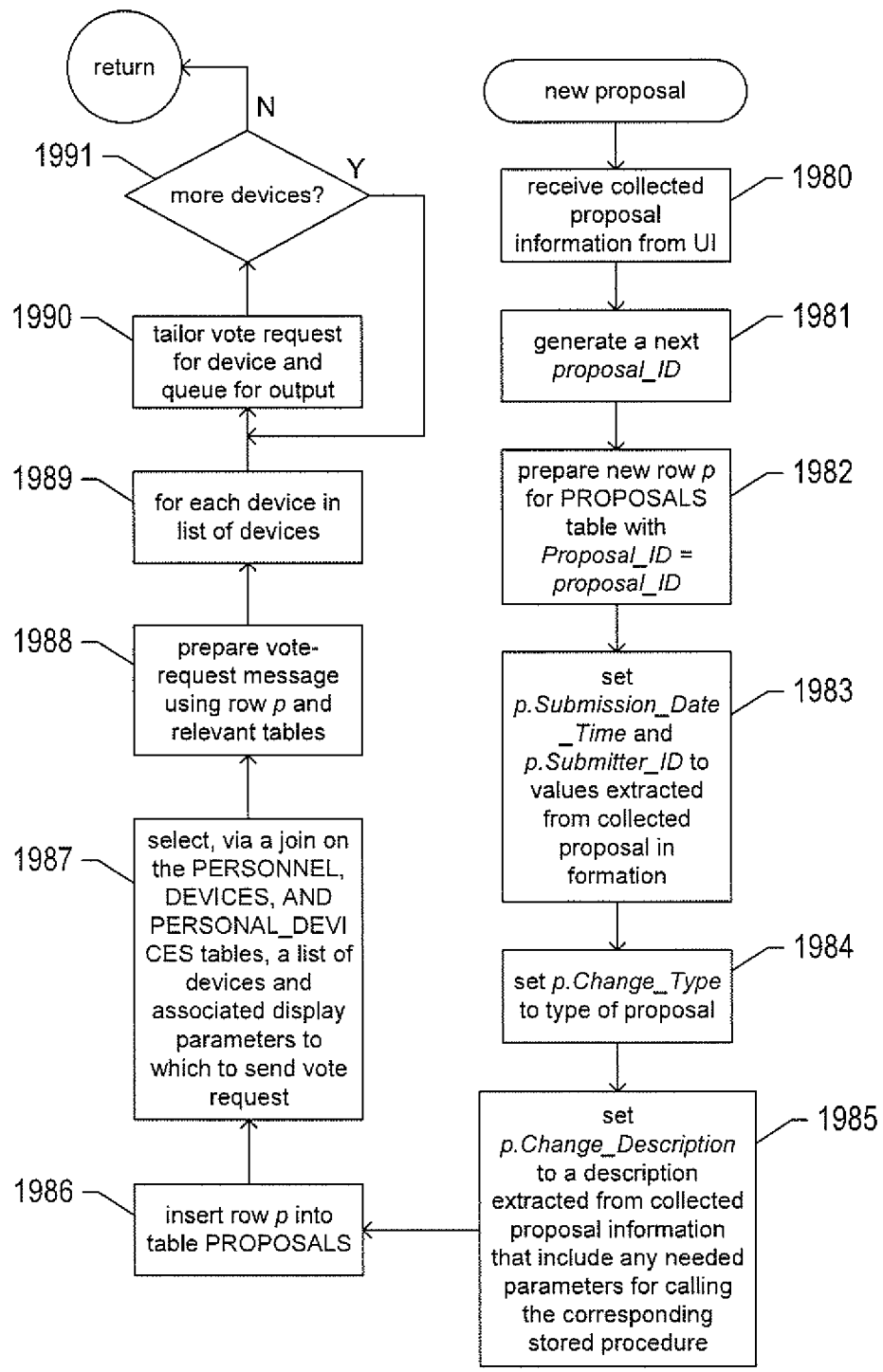

FIG. 19F provides a control-flow diagram for the handler "new proposal," called in step 1911 of The FIG. 19A. In step 1980, the handler "new proposal" receives collected proposal information from the UI. In step 1981, the new-proposal handler generates a next proposal identifier. In step 1982, the new-proposal handler prepares a new row p for the proposals table with field value Proposal_ID equal to the proposal identifier included in the received collected proposal information from the UI. In step 1983, the new-proposal handler sets the Submission_Data_Time and Submitter_ID field values for the row p to information extracted from the collected proposal information. In step 1984, the Change_Type field for the row p is set to an indication of the type of the proposed modification. In step 1985, the Change_Description field of new row p is set to a description extracted from the collected proposal information that includes any needed parameter values for calling the corresponding stored procedure that effects the proposed modification when it is determined that the proposal has succeeded. In step 1986, the new row p is inserted into the table PROPOSALS. In step 1987, a list of devices to which to send a vote request to solicit votes on the currently considered proposal is prepared via a select statement that uses a join on the PERSONNEL, DEVICES, and PERSONAL_DEVICES tables. In step 1988, a vote-request message is prepared using information in the row p of the PROPOSALS table and any other relevant information contained in other of the relational database tables. Finally, in the for-loop of steps 1989-1971, the vote message is tailored for each device and queued to an output queue for transmission.

As mentioned above, there are many possible implementation variations for the currently disclosed collaborative alert-generations-and-distribution system. More sophisticated consensus-determination methodologies may be used in the case that only subsets of participants vote for particular proposals, or in case that participant votes are given different weights. More sophisticated device-list-determination methods are needed in such cases, as well. In many implementations, consensus determination automatically results in proposed-modification acceptance and implementation, while, in other implementations, only a subset of the possible proposed modifications may be automatically implemented, with others implemented only by a system administrator or other authorized individual. As noted, above, alerts may be grouped into alert groups, and the group to which an alert belongs may determine how proposed modifications are accepted and implemented, to whom vote requests are distributed, and who can propose modifications to alert parameters.

Although the present invention has been described in terms of particular embodiments, it is not intended that the invention be limited to these embodiments. Modification within the spirit of the invention will be apparent to those skilled in the art. For example, any of many different alternative implementations can be obtained by varying any of many different design and implementation parameters, including choice of hardware components and configurations of distributed computer systems, choice of programming languages, operating systems, virtualization layers, control structures, data structures, modular organization, and other such design and implementation parameters. While the currently disclosed implementation uses relational database for storing relevant data, formatted files, non-relational databases, and other data-storage techniques may be instead use in alternative implementations. Many additional sophisticated features may be included in a collaborative alert-generation-and-distribution system or subsystem. For example, a collaborative alert-generation-and-distribution may additionally allow participants to define new alerts, including specification on event-message types corresponding to the alert.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A collaborative alert-generation-and-distribution system comprising: one or more processors; one or more memories; one or more mass-storage devices; a communications subsystem; and computer instructions, stored in one or more of the one or more memories that, when executed by one or more of the one or more processors, control the collaborative alert-generation-and-distribution system to receive alert-initiation requests, distribute alert messages to participants of the collaborative alert-generation-and-distribution system through the communications subsystem in response to receiving an alert-initiation request, receive a proposal to modify the collaborative alert-generation-and-distribution system from the participants, wherein the proposal comprises a unique identifier associated with a unique modification procedure, determine that the participants reached a consensus on a proposed modification, and modify the collaborative alert-generation-and-distribution system by executing the unique modification procedure associated with the unique modifier.

2. The collaborative alert-generation-and-distribution system of claim 1 wherein the alert-initiation requests are generated when events in a set of alert-triggering events occur within a distributed computer system.

3. The collaborative alert-generation-and-distribution system of claim 1 wherein an alert message is distributed to participants by:
   identifying, from data stored in one or more of the one or more mass-storage devices, a set of participants to which to transmit the alert;
   identifying, from data stored in one or more of the one or more mass-storage devices, a set of devices for each participant in the set of participants; and
   transmitting the alert message to each identified device in the set of identified devices for each identified participant in the set of identified participants.

4. The collaborative alert-generation-and-distribution system of claim 1 wherein proposals to modify the collaborative alert-generation-and-distribution system from the participants are received by:

displaying, on a participant's device, a user interface that allows a participant to input data that specifies a proposed modification to the alert-generation-and-distribution system;

returning, by the participant's device, the input data to the collaborative alert-generation-and-distribution system; and storing the returned input data in one or more of the one or more memories and/or one or more mass-storage devices.

5. The collaborative alert-generation-and-distribution system of claim 1 wherein, for each received proposal to modify the collaborative alert-generation-and-distribution system, the collaborative alert-generation-and-distribution system transmits vote requests to the participants.

6. The collaborative alert-generation-and-distribution system of claim 5 wherein the collaborative alert-generation-and-distribution system transmits vote requests to the participants by:

creating a vote-request message that includes information that describes a proposed modification to the collaborative alert-generation-and-distribution system;

identifying, from data stored in one or more of the one or more mass-storage devices, a set of participants to which to transmit the vote-request message;

identifying, from data stored in one or more of the one or more mass-storage devices, a set of devices for each participant in the set of participants; and transmitting the vote-request message to each identified device in the set of identified devices for each identified participant in the set of identified participants.

7. The collaborative alert-generation-and-distribution system of claim 1 wherein the participants reach a consensus on a proposed modification by:

returning vote-request messages to the collaborative alert-generation-and-distribution system, each of which includes a vote for or against the proposed modification; and when more than a threshold number of votes are received with respect to the proposed modification and when more than a threshold fraction of the received votes are favorable for the proposed modification, determining that a consensus has been reached to adopt the proposed modification.

8. The collaborative alert-generation-and-distribution system of claim 1 wherein the collaborative alert-generation-and-distribution system is modified according to a proposed modification by one of:

executing a procedure to carry out the proposed modification; and notifying a system administrator or another authorized individual to carry out the proposed modification.

9. The collaborative alert-generation-and-distribution system of claim 1 wherein proposed Modifications to the collaborative alert-generation-and-distribution system include:

changing the status of an alert;
changing the name of an alert;
changing a description of an alert;
changing a priority associated with an alert;
adding a source for association with an alert;
removing a source from association with an alert;
updating a source associated with an alert;
adding a participant recipient for an alert;
deleting a participant recipient for an alert;
adding a device type;
deleting a device type;
updating a device type; and
updating a rating associated with a participant.

10. The collaborative alert-generation-and-distribution system of claim 1 wherein the collaborative alert-generation-and-distribution system provides a user interface to participants that allows each participant to:

update the participant's personal data;
submit a proposed modification;
view submitted proposed modifications;
vote for or against a proposed modification;
when authorized, access an administrative user interface;
add a note for association with an alert;
view notes associated with an alert;
view the different alerts that are generated and distributed by the collaborative alert-generation-and-distribution system.

11. A method for modifying a collaborative alert-generation-and-distribution system having one or more processors, one or more memories, one or more mass-storage devices, and a communications subsystem, the collaborative alert-generation-and-distribution system receiving alert-initiation requests and distributing alert messages to participants of the collaborative alert-generation-and-distribution system through the communications subsystem in response to receiving an alert-initiation request, the method comprising:

receiving proposals to modify the collaborative alert-generation-and-distribution system from the participants, wherein the proposal comprises a unique identifier associated with a unique modification procedure, determining that the participants reached a consensus on a proposed modification, and modifying the collaborative alert-generation-and-distribution system by executing the unique modification procedure associated with the unique identifier.

12. The method of claim 11 wherein proposals to modify the collaborative alert-generation-and-distribution system from the participants are received by:

displaying, on a participant's device, a user interface that allows a participant to input data that specifies a proposed modification to the alert-generation-and-distribution system;

returning, by the participant's device, the input data to the collaborative alert-generation-and-distribution system; and storing the returned input data in one or more of the one or more memories and/or one or more mass-storage devices.

13. The method of claim 11 further comprising:

for each received proposal to modify the collaborative alert-generation-and-distribution system, transmitting vote requests to the participants.

14. The method of claim 13 wherein transmitting vote requests to the participants further comprises:

creating a vote-request message that includes information that describes a proposed modification to the collaborative alert-generation-and-distribution system;

identifying, from data stored in one or more of the one or more mass-storage devices, a set of participants to which to transmit the vote-request message;

identifying, from data stored in one or more of the one or more mass-storage devices, a set of devices for each participant in the set of participants; and transmitting the vote-request message to each identified device in the set of identified devices for each identified participant in the set of identified participants.

15. The method of claim 11 wherein the participants reach a consensus on a proposed modification by:

returning vote-request messages to the collaborative alert-generation-and-distribution system, each of which includes a vote for or against the proposed modification; and when more than a threshold number of votes are received with respect to the proposed modification and when more than a threshold fraction of the received votes are favorable for the proposed modification, determining that a consensus has been reached to adopt the proposed modification.

16. The method of claim 1 wherein modifying the collaborative alert-generation-and-distribution system according to a proposed modification further comprises one of:
   executing a procedure to carry out the proposed modification; and
   notifying a system administrator or another authorized individual to carry out the proposed modification.

17. The method of claim 11 wherein proposed modifications to the collaborative alert-generation-and-distribution system include:
   changing the status of an alert;
   changing the name of an alert;
   changing a description of an alert;
   changing a priority associated with an alert;
   adding a source for association with an alert;
   removing a source from association with an alert;
   updating a source associated with an alert;
   adding a participant recipient for an alert;
   deleting a participant recipient for an alert;
   adding a device type;
   deleting a device type;
   updating a device type; and
   updating a rating associated with a participant.

18. The method of claim 11 further comprising:
   providing a user interface to participants that allows each participant to
      update the participant's personal data,
      submit a proposed modification,
      view submitted proposed modifications,
      vote for or against a proposed modification,
      when authorized, access an administrative user interface,
      add a note for association with an alert,
      view notes associated with an alert, and
      view the different alerts that are generated and distributed by the collaborative alert-generation-and-distribution system.

19. Computer instructions encoded in a physical data-storage device that, when executed by one or more processors of a collaborative alert-generation-and-distribution system having one or more processors, one or more memories, one or more mass-storage devices, and a communications subsystem, control the collaborative alert-generation-and-distribution system to: receive alert-initiation requests, distribute alert messages to participants of the collaborative alert-generation-and-distribution system through the communications subsystem in response to receiving an alert-initiation request, receive proposals to modify the collaborative alert-generation-and-distribution system from the participants, wherein the proposal comprises a unique identifier associated with a unique modification procedure, determine that the participants reached a consensus on a proposed modification, and modify the collaborative alert-generation-and-distribution system by executing the unique modification procedure associated with the unique identifier.

20. The computer instructions of claim 19 wherein proposed modifications to the collaborative alert-generation-and-distribution system include:
   changing the status of an alert;
   changing the name of an alert;
   changing a description of an alert;
   changing a priority associated with an alert;
   adding a source for association with an alert;
   removing a source from association with an alert;
   updating a source associated with an alert;
   adding a participant recipient for an alert;
   deleting a participant recipient for an alert;
   adding a device type;
   deleting a device type;
   updating a device type; and
   updating a rating associated with a participant.

* * * * *